US011954735B1

(12) United States Patent
Chmielewski et al.

(10) Patent No.: US 11,954,735 B1
(45) Date of Patent: Apr. 9, 2024

(54) DIGITAL PROPERTY PROTECTION SYSTEMS

(71) Applicant: AON RISK SERVICES, INC. OF MARYLAND, New York, NY (US)

(72) Inventors: Nicholas Joseph Chmielewski, Chicago, IL (US); Jeffrey Scott Dwoskin, Somerville, MA (US); Paul Kim, Manhasset, NY (US); Daniel Crouse, Seattle, WA (US)

(73) Assignee: AON RISK SERVICES, INC. OF MARYLAND, New York, NY (US)

( * ) Notice: Subject to any disclaimer, the term of this patent is extended or adjusted under 35 U.S.C. 154(b) by 328 days.

(21) Appl. No.: 16/428,263

(22) Filed: May 31, 2019

(51) Int. Cl.
    G06Q 40/08 (2012.01)
    G06F 21/88 (2013.01)

(52) U.S. Cl.
    CPC ............ *G06Q 40/08* (2013.01); *G06F 21/88* (2013.01)

(58) Field of Classification Search
    CPC .................................................... G06Q 40/08
    USPC ...................................................... 705/4
    See application file for complete search history.

(56) References Cited

U.S. PATENT DOCUMENTS

| 2006/0195913 | A1* | 8/2006 | Popov | G06Q 30/00 726/28 |
| 2007/0226018 | A1* | 9/2007 | Gross | G06Q 10/06 705/4 |
| 2009/0287837 | A1* | 11/2009 | Felsher | G06F 21/6245 709/229 |
| 2010/0114634 | A1* | 5/2010 | Christiansen | G06Q 30/018 705/317 |
| 2014/0019171 | A1* | 1/2014 | Koziol | G06Q 40/08 705/4 |
| 2016/0112445 | A1* | 4/2016 | Abramowitz | H04L 63/1466 726/23 |

* cited by examiner

*Primary Examiner* — Lindsay M Maguire
(74) *Attorney, Agent, or Firm* — Lee & Hayes, P.C.

(57) ABSTRACT

Systems and methods for digital property protection are disclosed. For example, indication may be received that an entity has applied for an insurance policy to insure against theft of digital property. The digital property may be registered and a valuation of the digital property may be generated. Due diligence processes may be performed, including assessment of physical and/or network security mechanisms to prevent theft of the digital property. A recommendation to issue the insurance policy may be generated and sent in examples where the due diligence processes return favorable results. Terms generation and/or identification may be performed, and claims processing based at least in part on loss matrixes may also be performed.

13 Claims, 12 Drawing Sheets

Receive indication of claim submission
802

Determine existence and scope of trigger event
804

Receive indication that disclosure has been confirmed by third party
806

Identifying information showing no exclusions apply
808

Determine payout category under loss matrix
810

Recommend incident response
812

| Loss Matrix 900 | | | |
|---|---|---|---|
| Exposure Tier 902 | Triggering Event 904 | Payout Percentage 906 | Notes 908 |
| 3 | <ul><li>Digital property published in manner that makes secrecy improbable</li><li>Digital property exfiltrated, altered, deleted</li><li>Digital property used by competitor</li></ul> | 100% | |
| 2 | <ul><li>Digital property materially exfiltrated, altered, deleted, disclosed, used by third party</li></ul> | 75% | <ul><li>Digital property likely/ unlikely to be detected</li></ul> |
| 1 | <ul><li>Digital property downloaded, copied, viewed without authorization but not otherwise exfiltrated, deleted, altered, disclosed, or used by third party</li></ul> | 50% | <ul><li>Innovation cost</li><li>Remediation cost</li><li>Investigation cost</li></ul> |

FIG. 9

DIGITAL PROPERTY PROTECTION SYSTEMS

BACKGROUND

Intellectual property has been a valued asset class for individuals and business for some time. Like other assets, intellectual property, and particularly digital property such as trade secrets, is subject to theft. Described herein are improvements in technology and solutions to technical problems that can be used to, among other things, increase protection and loss mitigation associated with digital property.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 9 illustrates an example loss matrix in accordance with digital property protection systems.

DETAILED DESCRIPTION

Figure 1:
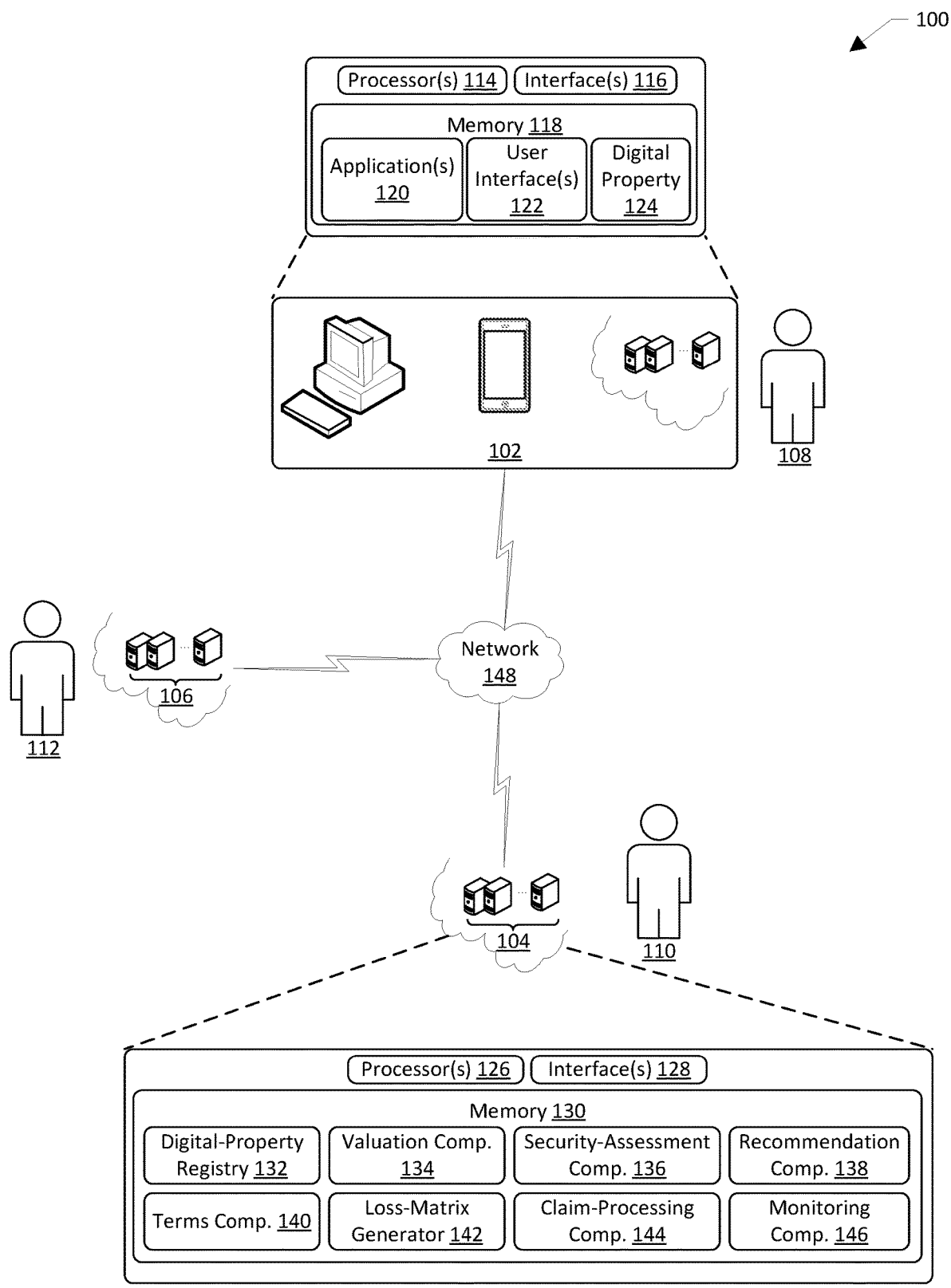
FIG. 1 illustrates a schematic diagram of an example architecture for digital property protection systems.

Systems and methods for digital property protection are disclosed. Take, for example, a company or individual, described herein as an entity, that owns one or more intellectual property assets. The intellectual property assets may include, for example, patents, copyrights, trademarks and/or brands, and/or trade secrets. For certain assets, such as digital property, theft or other misuse may cause significant damage to the entity that owns the digital property. While some legal avenues may allow for the entity to recoup damages from digital property theft and/or misuse, those avenues may not provide enough assurance to the entity that damages will be recouped. In these and other examples, the entity may desire to purchase insurance coverage for digital property theft and/or misuse. While such insurance coverage may exist in certain circumstances, it is not a common type of insurance and is generally disfavored due to due diligence failures and/or concerns and/or problems valuing the digital property and theft thereof.

The innovations described herein provide systems for digital property protection that, among other things, broker insurance policies between intellectual property owners and insurers. For example, a process of digital property protection may include registering the digital property with a digital property registry. In these examples, the owner of the digital property may identify the digital property to be registered and an obfuscation value may be generated that corresponds to the digital property. The obfuscation value may be sent from a device associated with the owner to a system associated with the digital property registry. The digital property registry may utilize the obfuscation value and/or information received from the device of the owner to generate a record in the digital property registry. The record may include the obfuscation value and/or other identifying information associated with the digital property. Additionally, the registry system may send the obfuscation value to a distributed-ledger system for registering the obfuscation value with a distributed ledger, such as a blockchain ledger. The distributed-ledger system may send a block value representing a block in the blockchain at which the obfuscation value has been registered, as well as other identifying information, such as a timestamp for the registration of the block with the blockchain. The registry system may store the block value along with the obfuscation value in association with the record for the digital property. By so doing, the registry system may be utilized to provide a secure way to register the digital property and identify when the digital property was registered, which may be important when determining if a disclosure of the digital property amounts to misuse and/or misappropriation.

Additionally, in examples, the process for digital property protection may include performing due diligence associated with the digital property and/or the entity associated with the digital property. For example, an intake form may be provided the entity, which may be requested to provide information in response to the intake form. The intake form may request information associated with what intellectual property is to be insured, valuation of the intellectual property, types of data associated with the intellectual property, types of users with access to the intellectual property, and/or other similar information. The entity may also be provided with a security questionnaire, which may request information to determine the adequacy of security measures associated with the intellectual property, to assess exposure of loss of the intellectual property, to provide recommendations to reduce exposure, to determine potential threats to the intellectual property, and/or to determine capabilities to detect and investigate incidents associated with the intellectual property, for example. The entity may also be provided with requests for valuation data, such as income data, development cost data, licensing data, etc. The request for this information may be provided by the insurer and/or by the broker and may be in the form of electronic files and/or a user interface. When a user interface, one or more wizards and/or applications may be utilized to present input fields for users of the system to input the requested information and/or documentation. The information and/or documentation may be encrypted such that the information and/or documents may be sent in a secure manner.

Additionally, in examples, the process for digital property protection may include performing a valuation of the intellectual property to be insured. For example, the valuation may include a qualitative analysis of the intellectual property. The qualitative analysis may include a scored, multi-factor assessment of asset opportunity and/or exposure. For example, a degree of coverage associated with the intellectual property may be determined. Additionally, a degree of opportunity to expand the intellectual property may be determined. Additionally, a degree of exposure of the intellectual property may be determined. These determinations may be made utilizing the information obtained during the due diligence processes described elsewhere herein. In general, a favorable qualitative analysis may include a high degree of coverage and opportunity with a low degree of exposure. The qualitative analysis may be utilized, at least in part, to perform a quantitative analysis of the intellectual property value. For example, the quantitative analysis may include an indication of an amount of income attributable to the intellectual property over the life of the asset, and/or a replacement and/or substitution cost of the asset, and/or a development cost of the asset. The quantitative analysis may be modeled over the course of the policy period for the insurance policy. The qualitative analysis and/or the quantitative analysis may be utilized to generate a report indicating the value of the intellectual property to be insured.

Additionally, in examples, the process for digital property protection may include performing an assessment of physical security and network security mechanisms in place with respect to the intellectual property. The security assessment processes may include gathering information associated with asset security, such as information obtained during the due diligence processes described above. The gathered information may indicate a scope of the intellectual property, one or more threats to the intellectual property, how the intellectual property is protected, detection capabilities, incident-response capabilities, and/or documentation to validate security capabilities. The security assessment processes may also include analyzing the information gathered to validate responses and/or generate data indicating a degree of physical and/or network security associated with the intellectual property. The security assessment processes may also include requesting additional information in light of the security analysis. Requesting additional information may include providing additional and/or differing requests for information and/or documentation to the entity associated with the intellectual property. Additionally, the security assessment process may include generating a maturity score for one or more security categories that indicate adequacy of current capabilities and level of exposure. Recommendations for security improvements may also be generated and sent to the entity associated with the digital property.

When performing the security analyses described above, determining a degree of network security and/or physical security may be based at least in part on security mechanisms and/or security scoring associated with one or more security categories. For example, the security categories may include one or more sharing mechanisms, one or more protection mechanisms, one or more security processes, security governance, logging and/or detection mechanisms, and/or threat identification. The sharing mechanisms may include analysis of access controls, periodic review of information sharing, third-party access to information, third-party external disclosure, and/or privilege level determinations. The protection mechanisms may include analysis of information storage locations, remote access capabilities and/or restrictions, encryption types and/or use, secure file transfer protocols, data-loss prevention tools, and/or physical security mechanisms. The security processes may include analysis of on-boarding and/or off-boarding processes, non-disclosure agreements, contractual agreements associated with the intellectual property, policy agreements, security training, and/or approval for information sharing and/or information transfer. The security governance analysis may include exposure analysis and/or management mechanisms, incident response planning and readiness, security assessments, security metrics, and/or security mechanism testing. The logging and/or detection mechanisms may include analysis of logging, monitoring, and/or triage capabilities and/or coverage, investigation procedures, forensic procedures, and/or loss-detection abilities. The threat identification analysis may include identification of the type of intellectual property held by the entity and security considerations associated with each intellectual property type and/or data formats and/or methods of access.

When analyzing the security mechanisms and/or categories described herein, the security assessment may include generating a score or similar metric for such categories. The score may be, for example, on a 1 to 5 scale, with 1 indicating deficient security, 2 indicating that security mechanisms are missing key elements, 3 indicating that security mechanisms meet minimum standards, 4 indicating that security mechanisms exceed minimum standards, and 5 indicating that security mechanisms have strong capabilities. It should be understood that while a 1 to 5 scale is used herein, it is used by way of example and not as a limitation. Other and/or different scales may be utilized and the indications of each portion of such scales may also differ. When a score indicates that the security mechanisms are deficient, that indication may be based at least in part on the security analysis resulting in a finding that critical controls to protect the intellectual property are missing or ineffective. When a score indicates that the security mechanisms are missing key elements, that indication may be based at least in part on a finding that critical capabilities are in place, but important controls to protect the intellectual property are missing or ineffective. When a score indicates that the security mechanisms meet minimum standards, that indication may be based at least in part on a finding that baseline capabilities and/or controls are in place, but there are opportunities to improve protection of the intellectual property. When a score indicates that the security mechanisms exceed minimum standards, that indication may be based at least in part on a finding that capabilities and/or controls exceed baseline requirements, with additional effective capabilities helping protect the intellectual property being identified. When a score indicates that the security mechanisms have strong capabilities, that indication may be based at least in part on a finding that significant capabilities and/or controls are in place to protect the intellectual property. By so doing, the security assessment will highlight gaps and/or areas in the controls that may be needed to protect intellectual property.

As part of the security assessment, and/or as part of additional due diligence operations, one or more recommendations may be generated and sent to the entity based at least in part on the scoring described above. The recommendations may be generated based at least in part on the security mechanism category and/or the score associated with each category. The recommendations may additionally be generated based at least in part on a given identified threat. For example, threats may be identified and a level of vulnerability to those threats may be determined. Additionally, a likelihood that a given threat may act on the intellectual property may also be determined. Generally, threats associated with high vulnerability levels and high likelihoods of acting will be the focus of recommendations for improvement. Additionally, the recommendations may include and/or may indicate a security statement representing where security mechanisms are lacking and/or may be improved. The recommendations may additionally, or alternatively, include an improvement recommendation representing a request and/or command to improve the security mechanism. By way of example, for the sharing mechanism category, the security statement may indicate that there is a lack of tracking of users with access to the intellectual property, and that the lack of tracking limits the entity's ability to enforce confidentiality of sensitive data. The improvement recommendation may include or indicate, for example, that the entity should limit access to the intellectual property based on a need to know and track access and approvals for access. Additional security statements and/or improvement recommendations may be generated and sent for one or more of the other security categories. In examples, the broker may require and/or recommend that the improvement recommendation be implemented as part of the due diligence processes described herein. In these examples, the broker may receive an indication that the entity has implemented the recommended improvement, and an indication of this action may be considered when recommending whether to issue an insurance policy covering theft of the intellectual property.

Additionally, in examples, the process for digital property protection may include performing an analysis of intellectual property theft detection. These theft detection processes may include identifying technologies and/or best practices for theft detection and determining whether the entity has employed those technologies and/or best practices. For example, the technologies may include packet capture devices, such as those with at least 10-14 days of data retention, data loss prevention technology, endpoint detection and response technology, intrusion detection systems, advanced firewalls (such as with SSL decryption capability), web filtering proxies, user behavior analytics tools, and/or digital rights management systems. The best practices may include classifying intellectual property in the network and segmenting the network with the intellectual property data, implementing network packet capture devices on network segments with the intellectual property, monitoring movement of intellectual property to compare against an approved list, investigation if data moves to unauthorized locations, and/or use of anomaly detection technologies and user behavior analysis to signal potential intellectual property theft activity. The technologies and/or best practices, in examples, may be based at least in part on the type of intellectual property at issue and/or the entity and/or entity type. In examples, the broker may send recommendations for improvement of the technologies and/or best practices implemented by the entity, and the broker, in these examples, may require and/or recommend that the improvement recommendation be implemented as part of the due diligence processes described herein. In these examples, the broker may receive an indication that the entity has implemented the recommended improvement, and an indication of this action may be considered when recommending whether to issue an insurance policy covering theft of the intellectual property.

Additionally, in examples, the process for digital property protection may include exposure transfer analysis. For example, the exposure transfer analysis may include determining whether a given insurance policy will cover loss caused by employee theft of the insured asset and/or loss caused by unauthorized access to the insured asset. The exposure transfer analysis may also include determination of when a loss event occurs, such as by identifying one or more conditions for determining when a loss event occurs. Those conditions may include a determination in writing by an incident forensic company that the asset was fully or partially downloaded, copied, viewed, altered, and/or deleted from the insured's system or a third-party system. The exposure transfer analysis may also include a determination of how losses will be determined, such as by multiplying the applicable sublimit of the insurance policy to the specific intellectual property at issue by the percentage associated with the triggering event and/or cause of the disclosure, which may be determined based at least in part on a loss matrix, described elsewhere herein. The exposure transfer analysis may also include a determination of one or more exclusions to coverage of an intellectual property theft event. The exclusions may include when the insured willfully and/or intentionally lessened the effectiveness of the information security mechanisms and/or physical security mechanisms, and/or if the insured willfully or intentionally attempted to disclose information regarding the intellectual property, and/or if the event that caused the disclosure occurred before the effective date of the insurance policy.

Additionally, in examples, the process for digital property protection may include claims processing. For example, an insured may file a claim for theft of the intellectual property. The claims processing may include receiving, identifying, and/or determining a scope of the event associated with the theft of the intellectual property. The scope may include an indication of whether the intellectual property was fully or partially downloaded, copied, viewed, altered, or deleted from the insured's system and/or a third-party system, or otherwise disclosed or used by someone without authorization or in contravention of the insured's security or policies. The process may also include receiving a confirmation, such as by a third-party incident forensic company, that the theft event has occurred and/or the scope of such an event. The claims process may also include determining if one or more of the exclusions associated with the insurance policy has occurred. The claims process may also include determining the amount of loss attributable to the theft event and/or the payout amount associated with the scope of loss, which may be determined based at least in part on the loss matrixes described herein. The claims process may also include incident response analysis, which may include actions to remedy and/or mitigate consequences of the event and/or to preserve evidence for use in mitigation and subrogation.

Additionally, in examples, the process for digital property protection may include generating a loss matrix associated with the insurance policy. The loss matrix may include one or more loss tiers, triggering events and/or causes associated with each tier, payout percentages associated with each tier, and/or notes or guidelines associated with each tier. For example, a loss matrix may include three loss tiers, each with at least one triggering event that indicates the type of loss that has occurred. For example, a first tier may include a triggering event such as the information having been downloaded, copied, and/or viewed without authorization or in contravention of security or policies but has not otherwise been exfiltrated, deleted, altered, disclosed, and/or used. A second tier may include a triggering event such as the information having been materially exfiltrated, altered, deleted, disclosed, and/or used. A third tier may include triggering events such as the information having been published in a manner that destroys trade secret protection afforded to the information, the information having been exfiltrated, altered, and/or deleted in a manner preventing use by the entity, and/or the information having been used by scheduled or similarly positioned key competitor(s). In this example, the third tier may be associated with a payout percentage that is more than the payout percentages associated with the other tiers. The second tier may be associated with a payout percentage that is less than the third-tier payout percentage but less than the first-tier payout percentage. The first tier may be associated with a payout percentage that is less than the second-tier payout percentage. Additional considerations may be utilized to determine differing payout percentages within a tier, such as whether use of the information is likely to be detectable or undetectable. Additional considerations may also be utilized to determine what the payout percentage may be in a given situation, such as the innovation costs associated with the intellectual property, the remediation costs for mitigation loss, and/or investigation costs for detection of theft.

Additionally, or alternatively, the processes described herein may include identifying and/or determining terms associated with the insurance policy. For example, the terms may include an enforcement-action provision indicating that the entity will be covered for a portion of costs incurred enforcing a right in the digital property. The terms may additionally, or alternatively, include a cyber-protection provision indicating that the entity will be covered for investigation costs associated with cyberthreats to the digital property. The terms may additionally, or alternatively, include a burden provision indicating that the entity carries the burden of proof that a trigger event has occurred requiring payout by the insurer. The terms of the insurance policy may be based at least in part on first prior insurance-policy terms issued to first entities associated with a first geographic location within a threshold distance from a second geographic location of the entity and/or second prior insurance-policy terms associated with a digital-property type of the digital property.

Additionally, or alternatively, the processes described herein may include receiving, from the entity and during a term of the insurance policy, one or more reports including updated information associated with one or more aspects of the entity. Additionally, the processes may include determining, based at least in part on the one or more reports, that the digital property has been disclosed to a third party, and sending, to at least one of the insurer or the entity, an indication that the digital property has been disclosed to the third party. In this way, monitoring of the property and/or the entity may be performed to ensure compliance with the terms of the insurance policy and to determine if a material event has occurred.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example architecture 100 for digital property protection. The architecture 100 may include, for example, one or more client-side devices, also described herein as electronic devices 102 and/or entity devices 102. The architecture 100 also includes a broker system 104 that is remote from, but in communication with, the client-side electronic devices 102. The architecture 100 also includes an insurer system 106 that is remote from, but in communication with, the client-side devices 102 and/or the broker system 104. Additionally, the entity devices 102 may be associated with an entity 108. The insurer system 106 may be associated with an insurer 112. Additionally, the broker system 104 may be associated with one or more individuals, such as a broking agent 110 (otherwise described herein as the broker 110).

The entity devices 102 may include components such as, for example, one or more processors 114, one or more network interfaces 116, and/or memory 118. The memory 118 may include components such as, for example, one or more applications 120, one or more user interfaces 112, and/or digital property 124. As shown in FIG. 1, the entity devices 102 may include, for example, a computing device, a mobile phone, a tablet, a laptop, and/or one or more servers. It should be understood that the examples provided herein are illustrative and should not be considered the exclusive examples of the components of the entity device 102. Additionally, one or more of the components of the entity device 102 may be generally utilized to perform one or more of the actions, operations, and/or steps described herein as being performed by the entity 108. The components of the memory 118 will be described below by way of example.

The broker system 104 may include components such as one or more processors 126, one or more network interfaces 128, and/or memory 130. The memory 130 may include one or more components such as a digital-property registry 132, a valuation component 134, a security-assessment component 136, a recommendation component 138, a terms component 140, a loss-matrix generator 142, a claim-processing component 144, and/or a monitoring component 146. It should be understood that the examples provided herein are illustrative and should not be considered the exclusive examples of the components of the broker system 104. Additionally, one or more of the components of the broker system 104 may be generally utilized to perform one or more of the actions, operations, and/or steps described herein as being performed by the broker 110. The components of the memory 130 will be described below by way of example.

Additionally, one or more of the components of the insurer system 106 may be generally utilized to perform one or more of the actions, operations, and/or steps described herein as being performed by the insurer 112.

To illustrate the functionality of the various systems and/or entities described herein, the following example processes for digital property protection are provided with respect to FIG. 1. For example, a process of digital property protection may include registering the digital property 124 with the digital property registry 132. In these examples, the entity 108 may identify the digital property 124 to be registered and an obfuscation value may be generated that corresponds to the digital property 124. The obfuscation value may be sent from the entity device 102 to the broker system 104. The broker system 104 may utilize the obfuscation value and/or information received from the entity device 102 to generate a record in the digital property registry 132. The record may include the obfuscation value and/or other identifying information associated with the digital property 124. Additionally, the broker system 104 may send the obfuscation value to a distributed-ledger system for registering the obfuscation value with the distributed ledger, such as a blockchain ledger. The distributed-ledger system may send a block value representing a block in the blockchain at which the obfuscation value has been registered, as well as other identifying information, such as a timestamp for the registration of the block with the blockchain. The broker system 104 may store the block value along with the obfuscation value in association with the record for the digital property 124. By so doing, the broker system 104 may be utilized to provide a secure way to register the digital property 124 and identify when the digital property 124 was registered, which may be important when determining if a disclosure of the digital property 124 amounts to misuse and/or misappropriation.

Additionally, in examples, the process for digital property protection may include the broker system 104 and/or the broker 110 performing due diligence associated with the digital property 124 and/or the entity 108. For example, an intake form may be provided to the entity 108, which may be requested to provide information in response to the intake form. The intake form may request information associated with what digital property 124 is to be insured, valuation of the digital property 124, types of data associated with the digital property 124, types of users with access to the digital property 124, and/or other similar information. The entity 108 may also be provided with a security questionnaire, which may request information to determine the adequacy of security measures associated with the digital property 124, to assess exposure of loss of the digital property 124, to provide recommendations to reduce exposure, to determine potential threats to the digital property 124, and/or to determine capabilities to detect and investigate incidents associated with the digital property 124, for example. The entity 108 may also be provided with requests for valuation data, such as income data, development cost data, licensing data, etc. The request for this information may be provided by the insurer system 106 and/or the insurer 112 and/or by the entity devices 102 and/or the entity 108 and may be in the form of electronic files and/or a user interface. When a user interface 122 is used, one or more wizards and/or applications 120 may be utilized to present input fields for users of the entity system 102 to input the requested information and/or documentation. The information and/or documentation may be encrypted such that the information and/or document may be sent in a secure manner.

Additionally, the valuation component 134 may be utilized to identify, determine, and/or generate one or more values of the digital property 124. For example, the valuation may include a qualitative analysis of the digital property 124. The qualitative analysis may include a scored, multi-factor assessment of asset opportunity and/or exposure. For example, a degree of coverage associated with the digital property 124 may be determined. Additionally, a degree of opportunity to expand the digital property 124 may be determined. Additionally, a degree of exposure of the digital property 124 may be determined. These determinations may be made utilizing the information obtained during the due diligence processes described elsewhere herein. In general, a favorable qualitative analysis may include a high degree of coverage and opportunity with a low degree of exposure. The qualitative analysis may be utilized, at least in part, to perform a quantitative analysis of the value of the digital property 124. For example, the quantitative analysis may include an indication of an amount of income attributable to the digital property 124 over the life of the digital property 124, and/or a replacement and/or substitution cost of the digital property 124, and/or a development cost of the digital property 124. The quantitative analysis may be modeled over the course of the policy period for the insurance policy. The qualitative analysis and/or the quantitative analysis may be utilized to generate a report indicating the value of the digital property 124 to be insured.

Additionally, the security-assessment component 136 may be configured to perform one or more security assessments on the network and/or physical security mechanisms in place to protect the digital property 124 from unwanted disclosure and/or use. The security assessment processes may include gathering information associated with asset security, such as information obtained during the due diligence processes described above. The gathered information may indicate a scope of the digital property 124, one or more threats to the digital property 124, how the digital property 124 is protected, detection capabilities, incident-response capabilities, and/or documentation to validate security capabilities. The security assessment processes may also include analyzing the information gathered to validate responses and/or generate data indicating a degree of physical and/or network security associated with the digital property 124. The security assessment processes may also include requesting additional information in light of the security analysis. Requesting additional information may include providing additional and/or differing requests for information and/or documentation to the entity associated with the intellectual property. Additionally, the security assessment process may include generating a maturity score for one or more security categories that indicate adequacy of current capabilities and level of exposure. Recommendations for security improvements may also be generated, such as by the recommendation component 138, and sent to the entity 108 associated with the digital property 124.

When performing the security analyses described above, the security-assessment component 136 may be configured to determine a degree of network security and/or physical security based at least in part on security mechanisms and/or security scoring associated with one or more security categories. For example, the security categories may include one or more sharing mechanisms, one or more protection mechanisms, one or more security processes, security governance, logging and/or detection mechanisms, and/or threat identification. The sharing mechanisms may be analyzed for access controls, periodic review of information sharing, third-party access to information, third-party external disclosure, and/or privilege level determinations, for example. The protection mechanisms may be analyzed for information storage locations, remote access capabilities and/or restrictions, encryption types and/or use, secure file transfer protocols, data-loss prevention tools, and/or physical security mechanisms, for example. The security processes may be analyzed for on-boarding and/or off-boarding property 124, policy agreements, security training, and/or approval for information sharing and/or information transfer, for example. The security governance may be analyzed for exposure and/or management mechanisms, incident response planning and readiness, security assessments, security metrics, and/or security mechanism testing, for example. The logging and/or detection mechanisms may be analyzed for logging, monitoring, and/or triage capabilities and/or coverage, investigation procedures, forensic procedures, and/or loss-detection abilities, for example. The threat identification may be analyzed for capabilities to identify the type of digital property 124 held by the entity 108 and security considerations associated with each digital property type and/or data formats and/or methods of access. It should be understood that more, less, and/or different security categories may be identified and/or determined other than those specifically listed herein. Additionally, it should be understood that more, less, and/or different information associated with each or some of the categories may be analyzed.

When analyzing the security mechanisms and/or categories described herein, the security-assessment component 136 may be configured to generate a score or similar metric for some or all of the categories. The score may be, for example, on a 1 to 5 scale, with 1 indicating deficient security, 2 indicating that security mechanisms are missing key elements, 3 indicating that security mechanisms meet minimum standards, 4 indicating that security mechanisms exceed minimum standards, and 5 indicating that security mechanisms have strong capabilities. It should be understood that while a 1 to 5 scale is used herein, it is used by way of example and not as a limitation. Other and/or different scales may be utilized and the indications of each portion of such scales may also differ. When a score indicates that the security mechanisms are deficient, that indication may be based at least in part on the security analysis resulting in a finding that critical controls to protect the digital property 124 are missing or ineffective. When a score indicates that the security mechanisms are missing key elements, that indication may be based at least in part on a finding that critical capabilities are in place, but important controls to protect the digital property 124 are missing or ineffective. When a score indicates that the security mechanisms meet minimum standards, that indication may be based at least in part on a finding that baseline capabilities and/or controls are in place, but there are opportunities to improve protection of the digital property 124. When a score indicates that the security mechanisms exceed minimum standards, that indication may be based at least in part on a finding that capabilities and/or controls exceed baseline requirements, with additional effective capabilities helping protect the digital property 124. When a score indicates that the security mechanisms have strong capabilities, that indication may be based at least in part on a finding that significant capabilities and/or controls are in place to protect the digital property 124. By so doing, the security assessment will highlight gaps and/or areas in the controls that may be needed to protect the digital property 124.

The recommendation component 138 may be configured to generate one or more recommendations associated with the processes described herein. For example, the recommendation component 138 may generate a recommendation based at least in part on the scoring described above. The recommendations may be generated based at least in part on the security mechanism category and/or the score associated with each category. The recommendations may additionally be generated based at least in part on a given identified threat. For example, threats may be identified and a level of vulnerability to those threats may be determined. Additionally, a likelihood that a given threat may act on the digital property 124 may also be determined. Generally, threats associated with high vulnerability levels and high likelihoods of acting will be the focus of recommendations for improvement.

Additionally, the recommendations may include and/or may indicate a security statement representing where security mechanisms are lacking and/or may be improved. The recommendations may additionally, or alternatively, include an improvement recommendation representing a request and/or command to improve the security mechanism. By way of example, for the sharing mechanism category, the security statement may indicate that there is a lack of tracking of users with access to the digital property 124, and that the lack of tracking limits the entity's 108 ability to enforce confidentiality of sensitive data. The improvement recommendation may include and/or indicate, for example, that the entity 108 should limit access to the digital property 124 based on a need to know and track access and approvals for access. Additional security statements and/or improvement recommendations may be generated and sent for one or more of the other security categories. In examples, the broker 110 may require and/or recommend that the improvement recommendation be implemented as part of the due diligence processes described herein. In these examples, the broker 110 may receive an indication that the entity 108 has implemented the recommended improvement, and an indication of this action may be considered when recommending whether to issue an insurance policy covering theft of the digital property 124.

Additionally, the recommendation component 138 may be configured to identify, determine, and/or generate recommendations indicating that an insurance policy should or should not be issued to the entity 102 to cover theft of the digital property 124. The recommendation may be generated based at least in part on the results from the valuation component 134, the security-assessment component 136, the terms component 140, and/or the loss-matrix component 144, for example. The recommendation may be sent to the insurer system 106 and/or the entity device 102.

Additionally, the security-assessment component 136 may be configured to perform an analysis of digital property theft detection. These theft detection processes may include identifying technologies and/or best practices for theft detection and determining whether the entity 108 has employed those technologies and/or best practices. For example, the technologies may include packet capture devices, such as those with at least 10-14 days of data retention, data loss prevention technology, endpoint detection and response technology, intrusion detection systems, advanced firewalls (such as with SSL decryption capability), web filtering proxies, user behavior analytics tools, and/or digital rights management systems. The best practices may include classifying digital property 124 in the network and segmenting the network with the digital property data, implementing network packet capture devices on network segments with the digital property 124, monitoring movement of digital property 124 to compare against an approved list, investigation if data moves to unauthorized locations, use of anomaly detection technologies and user behavior analysis to signal potential digital property theft activity. The technologies and/or best practices, in examples, may be based at least in part on the type of intellectual property at issue and/or the entity 108 and/or entity type. In examples, the broker 110 may send recommendations, such as via the recommendation component 138, for improvement of the technologies and/or best practices implemented by the entity 108, and the broker 110, in these examples, may require and/or recommend that the improvement recommendation be implemented as part of the due diligence processes described herein. In these examples, the broker 110 may receive an indication that the entity 108 has implemented the recommended improvement, and an indication of this action may be considered when recommending whether to issue an insurance policy covering theft of the intellectual property.

Additionally, the terms component 140 may be configured to identify, determine, and/or generate insurance-policy terms and/or indications of terms to be included in the insurance policy. For example, an exposure transfer analysis may be performed by the terms component 140 and may include determining whether a given insurance policy will cover loss caused by employee theft of the insured asset and/or loss caused by unauthorized access to the insured asset. The exposure transfer analysis may also include determination of when a loss event occurs, such as by identifying one or more conditions for determining when a loss event occurs. Those conditions may include a determination in writing by an incident forensic company that the digital property 124 was fully or partially downloaded, copied, viewed, altered, and/or deleted from the entity system 102 or a third-party system. The exposure transfer analysis may also include a determination of how losses will be determined, such as by multiplying the applicable sub-limit of the insurance policy to the specific digital property 124 at issue by the percentage associated with the triggering event and/or cause of the disclosure, which may be determined based at least in part on a loss matrix, described elsewhere herein. The exposure transfer analysis may also include a determination of one or more exclusions to coverage of a digital property theft event. The exclusions may include when the entity 108 willfully and/or intentionally lessened the effectiveness of the information security mechanisms and/or physical security mechanisms, and/or if the entity 108 willfully or intentionally attempted to disclose information regarding the digital property 124, and/or if the event that caused the disclosure occurred before the effective date of the insurance policy.

Additionally, or alternatively, the terms component 140 may identify and/or determine terms such as an enforcement-action provision indicating that the entity 108 will be covered for a portion of costs incurred enforcing a right in the digital property 124. The terms may additionally, or alternatively, include a cyber-protection provision indicating that the entity 108 will be covered for investigation costs associated with cyberthreats to the digital property 124. The terms may additionally, or alternatively, include a burden provision indicating that the entity 108 carries the burden of proof that a trigger event has occurred requiring payout by the insurer 112. The terms of the insurance policy may be based at least in part on first prior insurance-policy terms issued to first entities associated with a first geographic location within a threshold distance from a second geographic location of the entity and/or second prior insurance-policy terms associated with a digital-property type of the digital property 124.

Additionally, the claims-processing component 144 may be configured to process claims that may be filed and/or received from the entity 108 in an attempt to collect a payout amount pursuant to the terms of the insurance policy. For example, the entity 108 may file a claim for theft of the digital property 124. It should be understood that anywhere in this disclosure where the digital property 124 is described as stolen or that a theft event has occurred, those terms include any misuse and/or disclosure of the digital property 124 that amounts to a or may amount to a triggering event under the terms of the insurance policy. The claim-processing component 144 may receive, identify, and/or determine a scope of the event associated with the theft of the digital property 124. The scope may include an indication of whether the digital property 124 was fully or partially downloaded, copied, viewed, altered, or deleted from the entity system 102 and/or a third-party system, or otherwise disclosed or used by someone without authorization or in contravention of the entity's 108 security or policies. The process may also include receiving a confirmation, such as by a third-party incident forensic company, that the theft event has occurred and/or the scope of such an event. The claims process may also include determining if one or more of the exclusions associated with the insurance policy has occurred. The claims process may also include determining the amount of loss attributable to the theft event and/or the payout amount associated with the scope of loss, which may be determined based at least in part on the loss matrixes described herein. The claims process may also include an incident response analysis, which may include identification of actions to remedy and/or mitigate consequences of the event and/or to preserve evidence for use in mitigation and subrogation.

Additionally, the loss-matrix generator 142 may be configured to identify, determine, and/or generate one or more loss matrixes associated with the insurance policy. A loss matrix may include one or more loss tiers, triggering events and/or causes associated with each tier, payout percentages associated with each tier, and/or notes or guidelines associated with each tier. For example, a loss matrix may include three loss tiers, each with at least one triggering event that indicates the type of loss that has occurred. For example, a first tier may include a triggering event such as the information having been downloaded, copied, and/or viewed without authorization or in contravention of security or policies but has not otherwise been exfiltrated, deleted, altered, disclosed, and/or used. A second tier may include a triggering event such as the information having been materially exfiltrated, altered, deleted, disclosed, and/or used. A third tier may include triggering events such as the information having been published in a manner that destroys trade secret protection afforded to the information, the information having been exfiltrated, altered, and/or deleted in a manner preventing use by the entity 108, and/or the information having been used by scheduled or similarly positioned key competitor(s). In this example, the third tier may be associated with a payout percentage that is more than the payout percentages associated with the other tiers. The second tier may be associated with a payout percentage that is less than the third-tier payout percentage but less than the first-tier payout percentage. The first tier may be associated with a payout percentage that is less than the second-tier payout percentage. Additional considerations may be utilized to determine differing payout percentages within a tier, such as whether use of the information is likely to be detectable or undetectable. Additional considerations may also be utilized to determine what the payout percentage may be in a given situation, such as the innovation costs associated with the digital property 124, the remediation costs for mitigation loss, and/or investigation costs for detection of theft.

Additionally, the monitoring component 146 may be configured to monitor the digital property 124 and/or disclosure and/or valuation thereof, and/or to monitor the entity 108. For example, the broker system 104 may receive, from the entity 108 and during a term of the insurance policy, one or more reports including updated information associated with one or more aspects of the entity 108. Additionally, the monitoring component 146 may determine, based at least in part on the one or more reports, that the digital property 124 has been disclosed to a third party. An indication that the digital property 124 has been disclosed may be sent to the insurer 112 and/or the entity 108. In this way, monitoring of the digital property 124 and/or the entity 108 may be performed to ensure compliance with the terms of the insurance policy and to determine if a material event has occurred. Other material events may include determining that the valuation of the digital property 124 has changed in a material way, determining that a material negative event has occurred with respect to the digital property 124 and/or entity 108.

Additionally, in examples, one or more wizards may be enabled and may present options associated with the processes and actions described above, such as with respect to the intake document, for example. The wizards as described herein may be a set of dialog boxes and/or input fields configured to be displayed, such as via the entity device 102.

As shown in FIG. 1, several of the components of the broker system 104 and/or the insurer system 106 and the associated functionality of those components as described herein may be performed by one or more of the other systems and/or by the entity device 102. Additionally, or alternatively, some or all of the components and/or functionalities associated with the entity device 102 may be performed, at least in part, by the broker system 104 and/or the insurer system 106.

It should be noted that the exchange of data and/or information as described herein may be performed only in situations where a user has provided consent for the exchange of such information. For example, a user may be provided with the opportunity to opt in and/or opt out of data exchanges between devices and/or with the systems and/or for performance of the functionalities described herein. Additionally, when one of the devices is associated with a first user account and another of the devices is associated with a second user account, user consent may be obtained before performing some, any, or all of the operations and/or processes described herein.

It should be understood that anywhere in this disclosure where the term "digital property" and/or "trade secret" is used, it should be noted to include not only trade secrets, but any document and/or data and/or information including confidential information, know-how, and other information, and not necessarily documents, data, and/or information meeting a legal definition of the term "trade secret."

As used herein, a processor, such as processor(s) 114 and/or 126, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 114 and/or 126 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 114 and/or 126 may possess its own local memory, which also may store program components, program data, and/or one or more operating systems.

The memory 118 and/or 130 may include volatile and nonvolatile memory, removable and non-removable media implemented in any method or technology for storage of information, such as computer-readable instructions, data structures, program component, or other data. Such memory 118 and/or 130 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118 and/or 130 may be implemented as computer-readable storage media ("CRSM"), which may be any available physical media accessible by the processor(s) 114 and/or 126 to execute instructions stored on the memory 118 and/or 130. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 118 and/or 130, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 116 and/or 128 may enable messages between the components and/or devices shown in architecture 100 and/or with one or more other remote systems, as well as other networked devices. Such network interface(s) 116 and/or 128 may include one or more network interface controllers (NICs) or other types of transceiver devices to send and receive messages over a network 148.

For instance, each of the network interface(s) 116 and/or 128 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 116 and/or 128 may include a wide area network (WAN) component to enable message over a wide area network.

Figure 2:
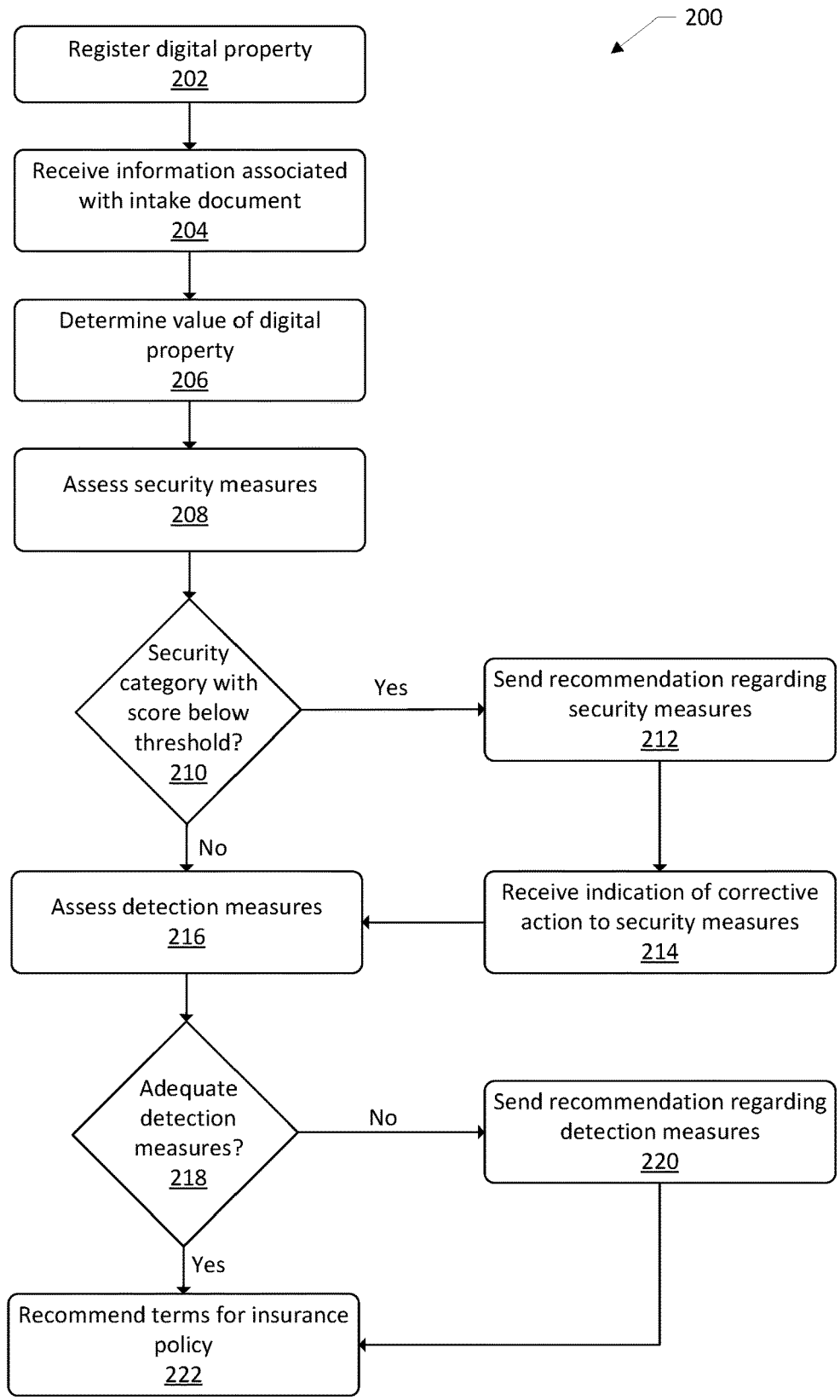
FIG. 2 illustrates a flow diagram of an example process for digital property protection.

FIG. 2 illustrates processes for digital property protection. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 3-12, although the processes may be implemented in a wide variety of other environments, architectures and systems.

FIG. 2 illustrates a flow diagram of an example process 200 for digital property collateral protection. The order in which the operations or steps are described is not intended to be construed as a limitation, and any number of the described operations may be combined in any order and/or in parallel to implement process 200. The operations described with respect to the process 200 are described as being performed by one or more individuals and/or teams of individuals. However, it should be understood that some or all of these operations may be performed by some or all of components, devices, and/or systems described herein.

At block 202, the process 200 may include registering a digital property in association with a digital-property registry. For example, an entity may identify the digital property to be registered and an obfuscation value may be generated that corresponds to the digital property. The obfuscation value may be sent from the entity device to the broker system. The broker system may utilize the obfuscation value and/or information received from the entity device to generate a record in the digital property registry. The record may include the obfuscation value and/or other identifying information associated with the digital property. Additionally, the broker system may send the obfuscation value to a distributed-ledger system for registering the obfuscation value with the distributed ledger, such as a blockchain ledger. The distributed-ledger system may send a block value representing a block in the blockchain at which the obfuscation value has been registered, as well as other identifying information, such as a timestamp for the registration of the block with the blockchain. The broker system may store the block value along with the obfuscation value in association with the record for the digital property. By so doing, the broker system may be utilized to provide a secure way to register the digital property and identify when the digital property was registered, which may be important when determining if a disclosure of the digital property amounts to misuse and/or misappropriation.

At block 204, the process 200 may include receiving information associated with an intake document. For example, an intake form may be provided to the entity, which may be requested to provide information in response to the intake form. The intake form may request information associated with what digital property is to be insured, valuation of the digital property, types of data associated with the digital property, types of users with access to the digital property, and/or other similar information. The entity may also be provided with a security questionnaire, which may request information to determine the adequacy of security measures associated with the digital property, to assess exposure of loss of the digital property, to provide recommendations to reduce exposure, to determine potential threats to the digital property, and/or to determine capabilities to detect and investigate incidents associated with the digital property, for example. The entity may also be provided with requests for valuation data, such as income data, development cost data, licensing data, etc. The request for this information may be provided by the insurer system and/or the insurer and/or by the entity devices and/or the entity and may be in the form of electronic files and/or a user interface. When a user interface is used, one or more wizards and/or applications may be utilized to present input fields for users of the entity system to input the requested information and/or documentation. The information and/or documentation may be encrypted such that the information and/or document may be sent in a secure manner.

At block 206, the process 200 may include determining a value of the digital property. For example, a valuation component may be utilized to identify, determine, and/or generate one or more values of the digital property. For example, the valuation may include a qualitative analysis of the digital property. The qualitative analysis may include a scored, multifactor assessment of asset opportunity and/or exposure. For example, a degree of coverage associated with the digital property may be determined. Additionally, a degree of opportunity to expand the digital property may be determined. Additionally, a degree of exposure of the digital property may be determined. These determinations may be made utilizing the information obtained during the due diligence processes described elsewhere herein. In general, a favorable qualitative analysis may include a high degree of coverage and opportunity with a low degree of exposure. The qualitative analysis may be utilized, at least in part, to perform a quantitative analysis of the value of the digital property. For example, the quantitative analysis may include an indication of an amount of income attributable to the digital property over the life of the digital property, and/or a replacement and/or substitution cost of the digital property, and/or a development cost of the digital property. The quantitative analysis may be modeled over the course of the policy period for the insurance policy. The qualitative analysis and/or the quantitative analysis may be utilized to generate a report indicating the value of the digital property to be insured.

At block 208, the process 200 may include assessing security measures associated with protecting the digital property from unwanted disclosure and/or use. For example, a security-assessment component may be configured to perform one or more security assessments on the network and/or physical security mechanisms in place to protect the digital property from unwanted disclosure and/or use. The security assessment processes may include gathering information associated with asset security, such as information obtained during the due diligence processes described above. The gathered information may indicate a scope of the digital property, one or more threats to the digital property, how the digital property is protected, detection capabilities, incident-response capabilities, and/or documentation to validate security capabilities. The security assessment processes may also include analyzing the information gathered to validate responses and/or generate data indicating a degree of physical and/or network security associated with the digital property. The security assessment processes may also include requesting additional information in light of the security analysis. Requesting additional information may include providing additional and/or differing requests for information and/or documentation to the entity associated with the intellectual property. Additionally, the security assessment process may include generating a maturity score for one or more security categories that indicate adequacy of current capabilities and level of exposure. Recommendations for security improvements may also be generated, such as by the recommendation component, and sent to the entity associated with the digital property.

When performing the security analyses described above, the security-assessment component may be configured to determine a degree of network security and/or physical security based at least in part on security mechanisms and/or security scoring associated with one or more security categories. For example, the security categories may include one or more sharing mechanisms, one or more protection mechanisms, one or more security processes, security governance, logging and/or detection mechanisms, and/or threat identification. The sharing mechanisms may be analyzed for access controls, periodic review of information sharing, third-party access to information, third-party external disclosure, and/or privilege level determinations, for example. The protection mechanisms may be analyzed for information storage locations, remote access capabilities and/or restrictions, encryption types and/or use, secure file transfer protocols, data-loss prevention tools, and/or physical security mechanisms, for example. The security processes may be analyzed for on-boarding and/or off-boarding property, policy agreements, security training, and/or approval for information sharing and/or information transfer, for example. The security governance may be analyzed for exposure and/or management mechanisms, incident response planning and readiness, security assessments, security metrics, and/or security mechanism testing, for example. The logging and/or detection mechanisms may be analyzed for logging, monitoring, and/or triage capabilities and/or coverage, investigation procedures, forensic procedures, and/or loss-detection abilities, for example. The threat identification may be analyzed for capabilities to identify the type of digital property held by the entity and security considerations associated with each digital property type and/or data formats and/or methods of access. It should be understood that more, less, and/or different security categories may be identified and/or determined other than those specifically listed herein. Additionally, it should be understood that more, less, and/or different information associated with each or some of the categories may be analyzed.

At block 210, the process 200 may include determining whether one or more security categories are associated with a score that is below a threshold score. For example, when analyzing the security mechanisms and/or categories described herein, the security-assessment component may be configured to generate a score or similar metric for some or all of the categories. The score may be, for example, on a 1 to 5 scale, with 1 indicating deficient security, 2 indicating that security mechanisms are missing key elements, 3 indicating that security mechanisms meet minimum standards, 4 indicating that security mechanisms exceed minimum standards, and 5 indicating that security mechanisms have strong capabilities. It should be understood that while a 1 to 5 scale is used herein, it is used by way of example and not as a limitation. Other and/or different scales may be utilized and the indications of each portion of such scales may also differ. When a score indicates that the security mechanisms are deficient, that indication may be based at least in part on the security analysis resulting in a finding that critical controls to protect the digital property are missing or ineffective. When a score indicates that the security mechanisms are missing key elements, that indication may be based at least in part on a finding that critical capabilities are in place, but important controls to protect the digital property are missing or ineffective. When a score indicates that the security mechanisms meet minimum standards, that indication may be based at least in part on a finding that baseline capabilities and/or controls are in place, but there are opportunities to improve protection of the digital property. When a score indicates that the security mechanisms exceed minimum standards, that indication may be based at least in part on a finding that capabilities and/or controls exceed baseline requirements, with additional effective capabilities helping protect the digital property. When a score indicates that the security mechanisms have strong capabilities, that indication may be based at least in part on a finding that significant capabilities and/or controls are in place to protect the digital property. By so doing, the security assessment will highlight gaps and/or areas in the controls that may be needed to protect the digital property.

In these examples, a security assessment score of 3 may be identified as the threshold score.

If one or more of the security categories are associated with a score below the threshold score, then at block 212, the process 200 may include sending a recommendation regarding the security measures. For example, the recommendations may include and/or may indicate a security statement representing where security mechanisms are lacking and/or may be improved. The recommendations may additionally, or alternatively, include an improvement recommendation representing a request and/or command to improve the security mechanism. By way of example, for the sharing mechanism category, the security statement may indicate that there is a lack of tracking of users with access to the digital property, and that the lack of tracking limits the entity's ability to enforce confidentiality of sensitive data. The improvement recommendation may include and/or indicate, for example, that the entity should limit access to the digital property based on a need to know and track access and approvals for access. Additional security statements and/or improvement recommendations may be generated and sent for one or more of the other security categories.

At block 214, the process 200 may include receiving an indication of corrective action to the security measures. For example, the broker may require and/or recommend that the improvement recommendation be implemented as part of the due diligence processes described herein. In these examples, the broker may receive an indication that the entity has implemented the recommended improvement, and an indication of this action may be considered when recommending whether to issue an insurance policy covering theft of the digital property.

Returning to block 210, if the security categories are associated with a score that is at or above the threshold score, and/or if the indication of corrective action is received at block 214, then at block 216, the process 200 may include assessing detection measures in place to detect theft of the digital property. For example, the security-assessment component may be configured to perform an analysis of digital property theft detection. These theft detection processes may include identifying technologies and/or best practices for theft detection and determining whether the entity has employed those technologies and/or best practices. For example, the technologies may include packet capture devices, such as those with at least 10-14 days of data retention, data loss prevention technology, endpoint detection and response technology, intrusion detection systems, advanced firewalls (such as with SSL decryption capability), web filtering proxies, user behavior analytics tools, and/or digital rights management systems. The best practices may include classifying digital property in the network and segmenting the network with the digital property data, implementing network packet capture devices on network segments with the digital property, monitoring movement of digital property to compare against an approved list, investigation if data moves to unauthorized locations, use of anomaly detection technologies and user behavior analysis to signal potential digital property theft activity. The technologies and/or best practices, in examples, may be based at least in part on the type of intellectual property at issue and/or the entity and/or entity type.

At block 218, the process 200 may include determining whether adequate detection measures are in place to detect theft of the digital property. For example, the determination of whether adequate detection measures are in place may be based at least in part on a comparison of the recommended technologies and/or best practices to the current technologies and/or best practices of the entity. If one or more of the recommended technologies and/or best practices are not implemented by the entity, that the detection measures may not be adequate. In other examples, a score may be assigned to the detection measures enabled by the entity and that score may be compared to a threshold detection score.

If adequate detection measures are not in place, then at block 220, the process 200 may include sending a recommendation regarding the detection measures to the entity. In examples, the broker may send recommendations, such as via the recommendation component, for improvement of the technologies and/or best practices implemented by the entity, and the broker, in these examples, may require and/or recommend that the improvement recommendation be implemented as part of the due diligence processes described herein. In these examples, the broker may receive an indication that the entity has implemented the recommended improvement, and an indication of this action may be considered when recommending whether to issue an insurance policy covering theft of the intellectual property.

At block 222, the process 200 may include recommending terms for the insurance policy. Recommending the terms may be based at least in part on determining that adequate detection and security measures are in place and/or receiving an indication that the entity has taken action to correct inadequate detection and/or security measures. For example, an exposure transfer analysis may be performed by the terms component and may include determining whether a given insurance policy will cover loss caused by employee theft of the insured asset and/or loss caused by unauthorized access to the insured asset. The exposure transfer analysis may also include determination of when a loss event occurs, such as by identifying one or more conditions for determining when a loss event occurs. Those conditions may include a determination in writing by an incident forensic company that the digital property was fully or partially downloaded, copied, viewed, altered, and/or deleted from the entity system or a third-party system. The exposure transfer analysis may also include a determination of how losses will be determined, such as by multiplying the applicable sublimit of the insurance policy to the specific digital property at issue by the percentage associated with the triggering event and/or cause of the disclosure, which may be determined based at least in part on a loss matrix, described elsewhere herein. The exposure transfer analysis may also include a determination of one or more exclusions to coverage of a digital property theft event. The exclusions may include when the entity willfully and/or intentionally lessened the effectiveness of the information security mechanisms and/or physical security mechanisms, and/or if the entity willfully or intentionally attempted to disclose information regarding the digital property, and/or if the event that caused the disclosure occurred before the effective date of the insurance policy.

Additionally, or alternatively, the terms component may identify and/or determine terms such as an enforcement-action provision indicating that the entity will be covered for a portion of costs incurred enforcing a right in the digital property. The terms may additionally, or alternatively, include a cyber-protection provision indicating that the entity will be covered for investigation costs associated with cyberthreats to the digital property. The terms may additionally, or alternatively, include a burden provision indicating that the entity carries the burden of proof that a trigger event has occurred requiring payout by the insurer. The terms of the insurance policy may be based at least in part on first prior insurance-policy terms issued to first entities associated with a first geographic location within a threshold distance from a second geographic location of the entity and/or second prior insurance-policy terms associated with a digital-property type of the digital property.

Figure 3:
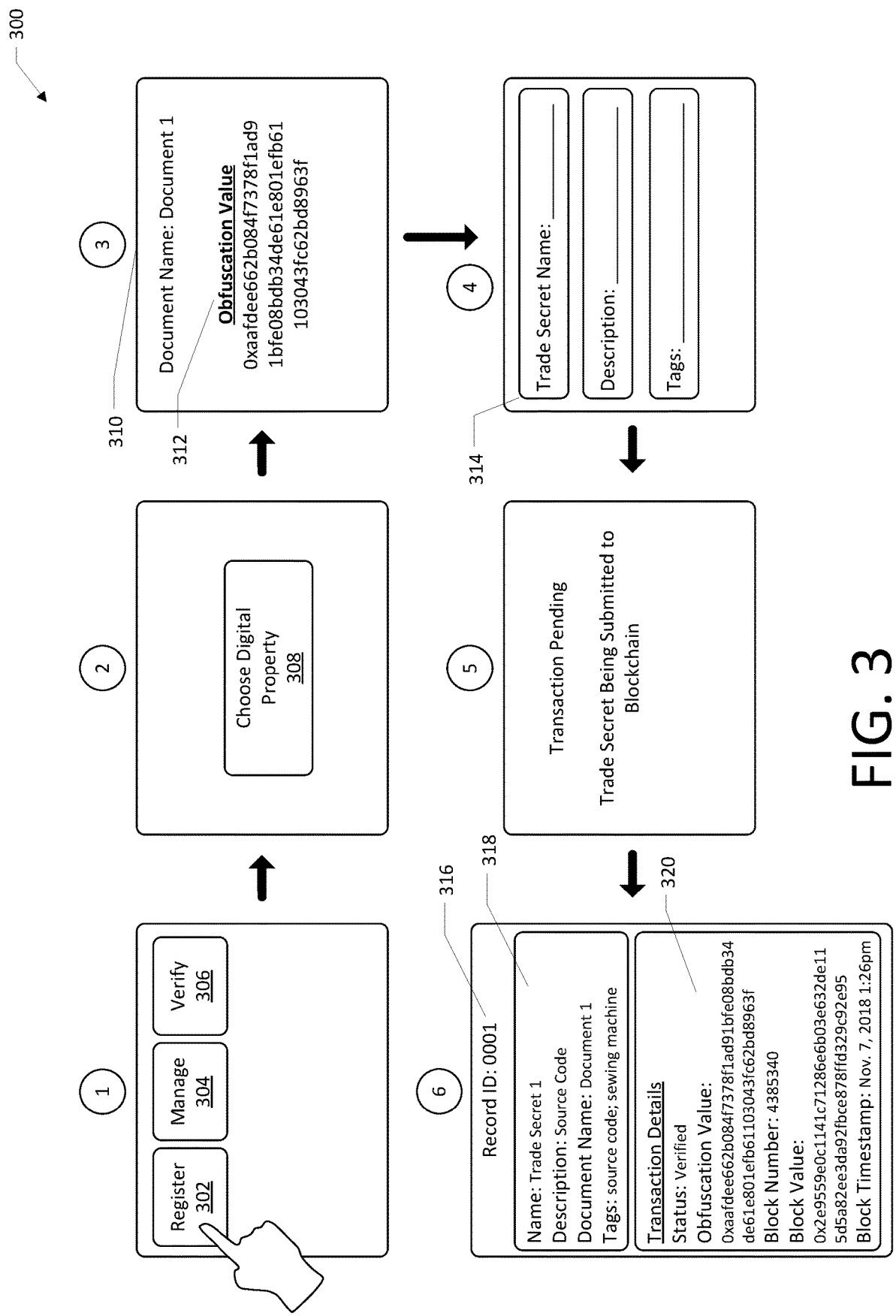
FIG. 3 illustrates an example user interface displaying digital property registration functionality in accordance with digital property protection systems.

FIG. 3 illustrates an example user interface 300 displaying digital property registration functionality in accordance with digital property protection systems. The user interface 300 may be displayed on a display of an electronic device, such as the entity device 102 as described with respect to FIG. 1. The user interface 300 may be the same as or similar to the user interface(s) 122 as described with respect to FIG. 1. FIG. 3 illustrates a progression, from left to right and top to bottom, of information displayed on and/or interactions with the user interface 300.

For example, the user interface 300, at step 1, may include a first selectable portion 302 indicating an option to register a digital property with a digital-property registry. The user interface 300 may also include a second selectable portion 304 indicating an option to manage registered digital property, and/or a third selectable portion 306 indicating an option to verify that a document has been registered in association with the digital-property registry. To illustrate the use and functionality of the user interface 300, a user may provide input indicating selection of the first selectable portion 302.

Selection of the first selectable portion 302 may cause the user interface 300 to display, at step 2, a fourth selectable portion 308 indicating an option to identify a document representing a digital property to be registered with the digital-property registry. Identification of the document may include input such as a naming indicator for the document and/or selection of a document from a database of an electronic device displaying the user interface 300, for example. The document may be identified and the electronic device may cause an obfuscation value to be generated corresponding to the document. For example, an obfuscation component may receive data corresponding to the document, such as from one or more databases and/or other storage locations associated with the electronic device and/or remote storage accessible by the electronic device. An obfuscation component may then generate a document obfuscation value corresponding to the document. In general, the obfuscation component may receive, as input, text data, image data, formatting data, and/or other data corresponding to the document, and may generate, as output, an obfuscation value that corresponds to the input. In examples, the electronic device may include multiple obfuscation components that each employ a different hashing algorithm. In these examples, each obfuscation component may output a different obfuscation value for the same document.

At step 3, the user interface 300 may include a naming indicator 310 for the document. The user interface 300 may also include the obfuscation value 312 as generated based at least in part on the document. As shown in FIG. 3, the naming indicator 310 for the document is "Document 1," and the document obfuscation value 312 is "0xaafdee662b084f7378f1 ad9lbfe08bdb34de 61e801efb61103043fc62bd8963f," by way of example.

At step 4, the user interface 300 may include one or more dialog boxes and/or input fields 314 associated with the digital property. The input fields 314 may include text requesting information from the user regarding the digital property. As shown in FIG. 3, by way of example, the input fields 314 may request information such as a digital property name, a description of the digital property, and/or one or more tags for the digital property. For example, a document that corresponds to source code to operate a sewing machine may be associated with keywords such as "source code," "sewing," "sewing machine," "version 1.1.20," etc. A user of the electronic device may input text corresponding to these tags and a tag-data generator may utilize such input to generate the tag data. Additionally, or alternatively, the tag-data generator may automatically generate tag data. For example, the tag-data generator may analyze the document to be registered in association with the digital-property registry to identify keywords associated with the document. For example, the tag-data generator may identify one or more fields of the document and/or values associated with those fields. By way of illustration, the tag-data generator may identify a title field, a document-type field, one or more sections of the document, etc. The values, such as the text data, associated with these fields may be utilized to generate tags. Additionally, or alternatively, text data of the document may be analyzed to determine which words are commonly used in the document. These words may be identified as keywords and may be utilized to generate the tag data.

At step 5, the user interface 300 may display text indicating a status of the registration process and/or a description of operations being performed, such as by a remote system associated with the digital-property registry and/or a remote system associated with a blockchain. For example, the text may state that the transaction is pending and may state that the digital property and/or the document obfuscation value is being submitted to the blockchain. While this text is being displayed, a communications component may generate request data indicating a request to register a digital property in association with the blockchain. The request data may be sent to the remote system associated with the blockchain along with, for example, the obfuscation value and/or an identifier of the document and/or the digital property, and/or other information associated with the document and/or the digital property. The remote system may receive the request data and the obfuscation value (or other data) and may register the obfuscation value (or the other data) in association with a block of the blockchain. The remote system may generate a cryptographic obfuscation value representing the block in the blockchain and/or the remote system may generate a time value indicating a time and/or day that the obfuscation value (or the other data) was registered with the blockchain. The remote system may send the cryptographic obfuscation value, the time value, and/or other information (such as a block number, for example) to the remote system associated with the digital-property registry.

In examples, multiple blockchain systems may be utilized to register the transaction between the digital-property registry system and the electronic device. For example, the obfuscation value may be sent to multiple blockchain systems, and each blockchain system may return a cryptographic obfuscation value corresponding to a block in their respective blockchains. As described more fully below, the record indicating registration of the digital property with the digital-property registry may include the multiple cryptographic obfuscation values and/or other information associated with registration of blocks in the multiple blockchains.

At step 6, the user interface 300 may display a record indicating that the trade secret has been registered with the digital-property registry. The record may include a record identifier 316, digital-property details 318, and/or transaction details 320. The record identifier 316 may include numbers and/or letters that identify the record with respect to the digital-property registry. The digital-property details 318 may, for example, include a naming indicator for the digital property, a description of the digital property, a naming indicator for the document representing the digital property, and/or the tags generated as described elsewhere herein. The transaction details 320 may include a status of the registration with the digital-property registry, the obfuscation value, a block number associated with the block at which the digital property is registered with the blockchain, the cryptographic obfuscation value (also described as the block obfuscation value), and/or the block timestamp. Other information that may be included in the record and displayed with respect to the user interface 300 may include insurance policy details, valuation details, and/or other information associated with the digital property, as described more fully elsewhere herein.

The record may be generated by a record generator of the broker system associated with the digital-property registry. The record may be stored along with one or more other records in the digital-property registry. The broker system, in examples, may generate confirmation data indicating that the record has been generated, and the confirmation data may be sent to the electronic device for display via a user interface 300.

Figure 4:
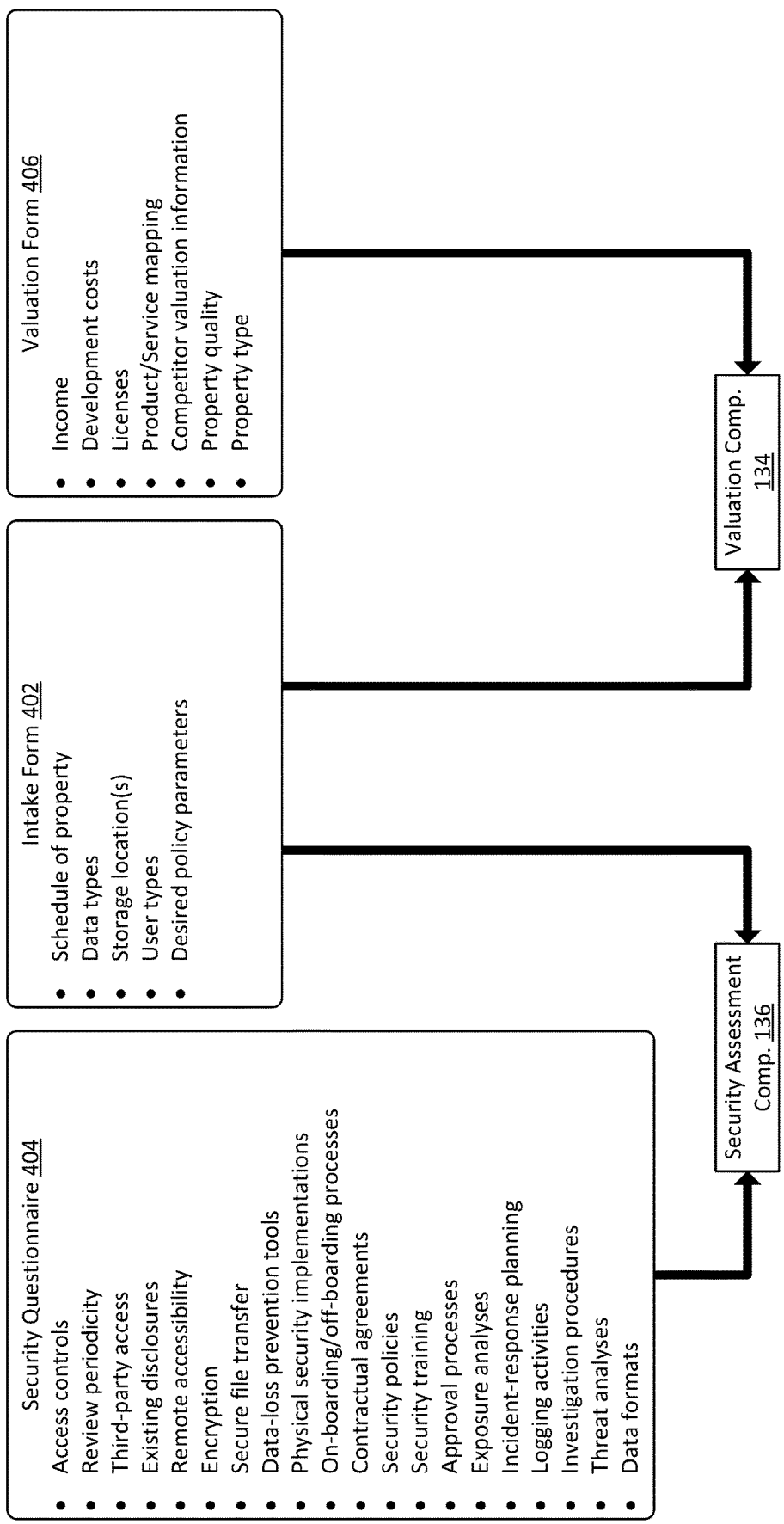
FIG. 4 illustrates example due-diligence categories and information utilized for digital property protection systems.

FIG. 4 illustrates example due-diligence categories and information utilized for digital property protection systems. For example, the due-diligence categories may include information obtained from an intake form 402, a security questionnaire 404, and/or valuation form 406. In examples, the intake form 402, the security questionnaire 404, and/or the valuation form 406 may be provided by a broker to the entity associated with the digital property for that entity to provide requested information. In other examples, a user interface may be display on a display of an electronic device associated with the entity. The entity may utilize the user interface to view requests for information and to provide responses/documentation to those requests.

In example, the intake form 402 may request information such as what property is to be insured, types of data associated with the property, types of users with access to the intellectual property, storage locations associated with the property, desired policy parameters, and/or other similar information. The security questionnaire 404 may request information to determine the adequacy of security measures associated with the property, to assess exposure of loss of the property, to provide recommendations to reduce exposure, to determine potential threats to the intellectual property, and/or to determine capabilities to detect and investigate incidents associated with the intellectual property, for example. For example, one or more requests associated with the security questionnaire 404 may include requests for access control information, review periodicity, third-party access controls, existing disclosures of the property, remote accessibility by employees/others, encryption, secure file transfer mechanisms, data-loss prevention tools, physical security implementations, on-boarding and/or off-boarding processes, contractual agreements associated with the property, security policies, security training, access approval processes, exposure analyses, incident-response planning, logging activities, investigation procedures, threat analyses, and/or data formats.

The valuation form 406 may include requests for valuation data associated with the digital property. For example, the entity may also be provided with requests for valuation data such as income data, development cost data, licensing data, etc. The request for this information may be provided by the insurer and/or by the broker and may be in the form of electronic files and/or a user interface. When a user interface, one or more wizards and/or applications may be utilized to present input fields for users of the system to input the requested information and/or documentation. The information and/or documentation may be encrypted such that the information and/or document may be sent in a secure manner.

In the example of FIG. 4, the information associated with the intake form 402 and/or the security questionnaire may be provided to the security-assessment component 136 for assessing security mechanisms put in place to prevent theft of the property. By way of further example, the information associated with the intake form 402 and/or the valuation form 406 may be provided to the valuation component 134 for identifying, determining, and/or generating a valuation of the property.

Figure 5:
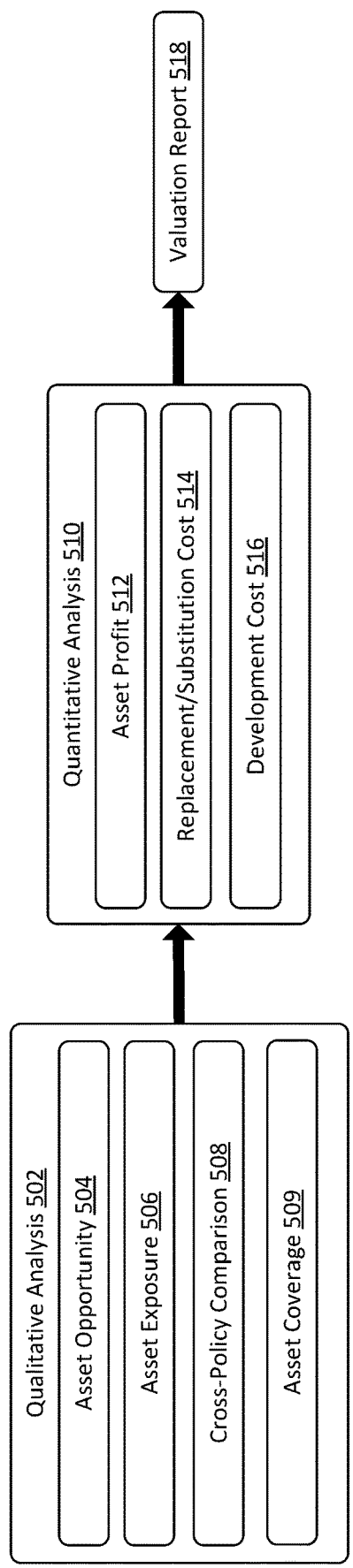
FIG. 5 illustrates information and processes for valuation determinations in accordance with digital property protection systems.

FIG. 5 illustrates information and processes for valuation determinations in accordance with digital property protection systems. For example, a valuation component, such as of a broker system, may be configured to identify, determine, and/or generate one or more valuations associated with digital property to be insured. The valuation may include a qualitative analysis 502 and/or a quantitative analysis 510.

The qualitative analysis 502 may include a scored, multifactor assessment of asset opportunity and/or exposure. For example, a degree of asset opportunity 504 to expand the digital property may be determined. Additionally, a degree of asset exposure 506 of the digital property may be determined. These determinations may be made utilizing the information obtained during the due diligence processes described elsewhere herein. In general, a favorable qualitative analysis may include a high degree of asset opportunity 504 with a low degree of asset exposure 506. The qualitative analysis 502 may also include a cross-policy comparison where valuations from one or more other digital properties associated with insurance policies may be utilized to compare and analogize to the digital property at issue. For example, digital property associated with entities in the same or a similar business sector as the entity in question may be utilized for comparisons. Additionally, valuations associated intellectual property types that are the same or similar to the intellectual property in question may be utilized for comparisons. Additionally, valuations associated with entities within the same or a similar geographic region as the entity in question may be utilized for comparisons.

Additionally, the qualitative analysis 502 may include determining a degree of coverage 509 associated with the intellectual property. Generally, a favorable qualitative intellectual property analysis 502 will result in good coverage 509 by the intellectual property. An analysis of the coverage 509 may include an analysis of, for example, the scope of the claims in patents of the intellectual property assets and/or the number of claims and/or patents. The coverage 509 may also include an analysis of, for example, a number of trade secrets maintained by the borrower and/or whether the trade secret have been registered with a trade secret registry. Additionally, the qualitative analysis 502 may include a cross-policy comparison 508, which may include receiving information associated with one or more insurance policies involving the intellectual property and/or the entity associated with the intellectual property. Due diligence associated with issuance of such insurance policies, including past valuations and/or determinations of characteristics of the intellectual property may be utilized from the insurance policies to inform the qualitative analysis 502 for the intellectual property in question.

The qualitative analysis 502 may be utilized, at least in part, to perform the quantitative analysis 510 of the value of the digital property. For example, the quantitative analysis 510 may include an indication of asset profit 512, which may be based at least in part on an amount of income attributable to the digital property over the life of the digital property, and/or a replacement and/or substitution cost 514 of the digital property, and/or a development cost 516 of the digital property. The quantitative analysis 510 may be modeled over the course of the policy period for the insurance policy. The qualitative analysis 502 and/or the quantitative analysis 510 may be utilized to generate a valuation report 518 indicating the value of the digital property to be insured. The valuation report 518 may provide an indication of the qualitative analysis 502, the quantitative analysis 510, the valuation(s), and/or the information considered and/or methodologies utilized for valuation. The valuation report 518 may be sent to the entity associated with the digital property and/or to the insurer to support or otherwise inform a decision to issue the insurance policy.

Figure 6:
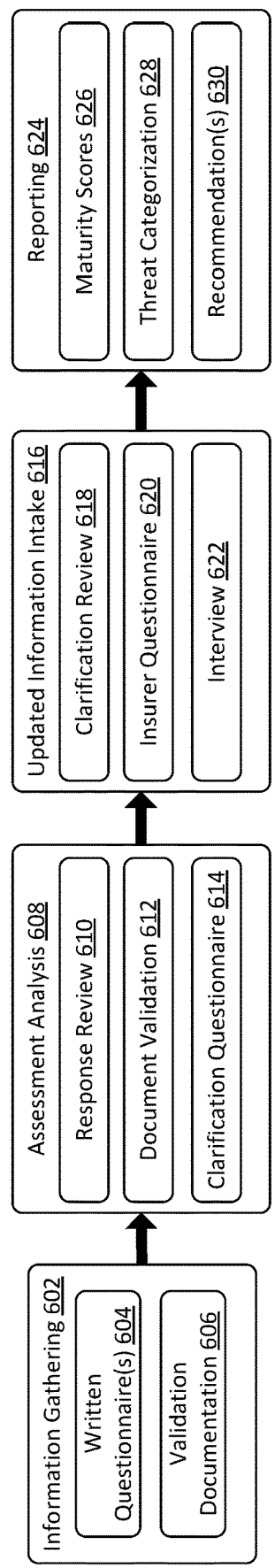
FIG. 6 illustrates information and processes for security assessments in accordance with digital property protection systems.

FIG. 6 illustrates information and processes for security assessments in accordance with digital property protection systems. For example, a security-assessment component may be configured to perform one or more security assessments on network and/or physical security mechanisms in place to protect digital property from unwanted disclosure and/or use. The security assessment processes may include, for example information gathering processes 602 associated with asset security, such as information obtained during the due diligence processes described above. The information gathering processes 602 may include sending written questionnaire(s) 604 and/or requests for validation documentation 606 to the entity associated with the digital property. The written questionnaires 604 may include the intake forms and/or the security questionnaires and/or the valuation forms described more fully elsewhere herein. The gathered information may indicate a scope of the digital property, one or more threats to the digital property, how the digital property is protected, detection capabilities, incident-response capabilities, and/or documentation to validate security capabilities.

The security assessment processes may also include an assessment analysis 608 on the information gathered to validate responses and/or generate data indicating a degree of physical and/or network security associated with the digital property. The assessment analysis 608 may include response review processes 610 for the information obtained during the information gathering processes 602. The assessment analysis 608 may also include document validation processes 612 for the validation documentation 606 obtaining during the information gathering processes 602. The assessment analysis 608 may also include the generating and sending of clarification questionnaire(s) 614 to the entity associated with the digital property. The clarification questionnaire(s) 614 may include requests for additional and/or confirmatory information associated with the responses to the written questionnaire(s) 604 and/or validation documentation 606.

The security assessment processes may also include updated information intake processes 616. Requesting additional information may include providing additional and/or differing requests for information and/or documentation to the entity associated with the intellectual property. For example, clarification review processes 618 may be performed on the information corresponding to responses to the clarification questionnaire(s) 614. Additionally, the updated information intake processes 616 may include generation of an insurer questionnaire 620 that may be sent to the insurer and ask for information on the insurer's insurance offerings as associated with the digital property at issue. The updated information intake processes 616 may also include an interview 622 to be conducted between the broker and the entity and/or the insurer to resolve pending issues not resolved by the clarification questionnaire(s) 614.

The security assessment processes may also include reporting processes 624, which may include the generation of maturity scores 626 for one or more categories of network and/or physical security mechanisms. The reporting processes 624 may also include threat categorization 628 for threats identified as having a potential for acting on the digital property. The reporting processes 624 may also include generating one or more recommendations 630, such as a recommendation 630 for security improvements to be implemented by the entity, theft-detection improvements to the implemented by the entity, and/or recommendations 630 on whether to offer insurance cover for theft of the digital property at issue.

Figure 7:
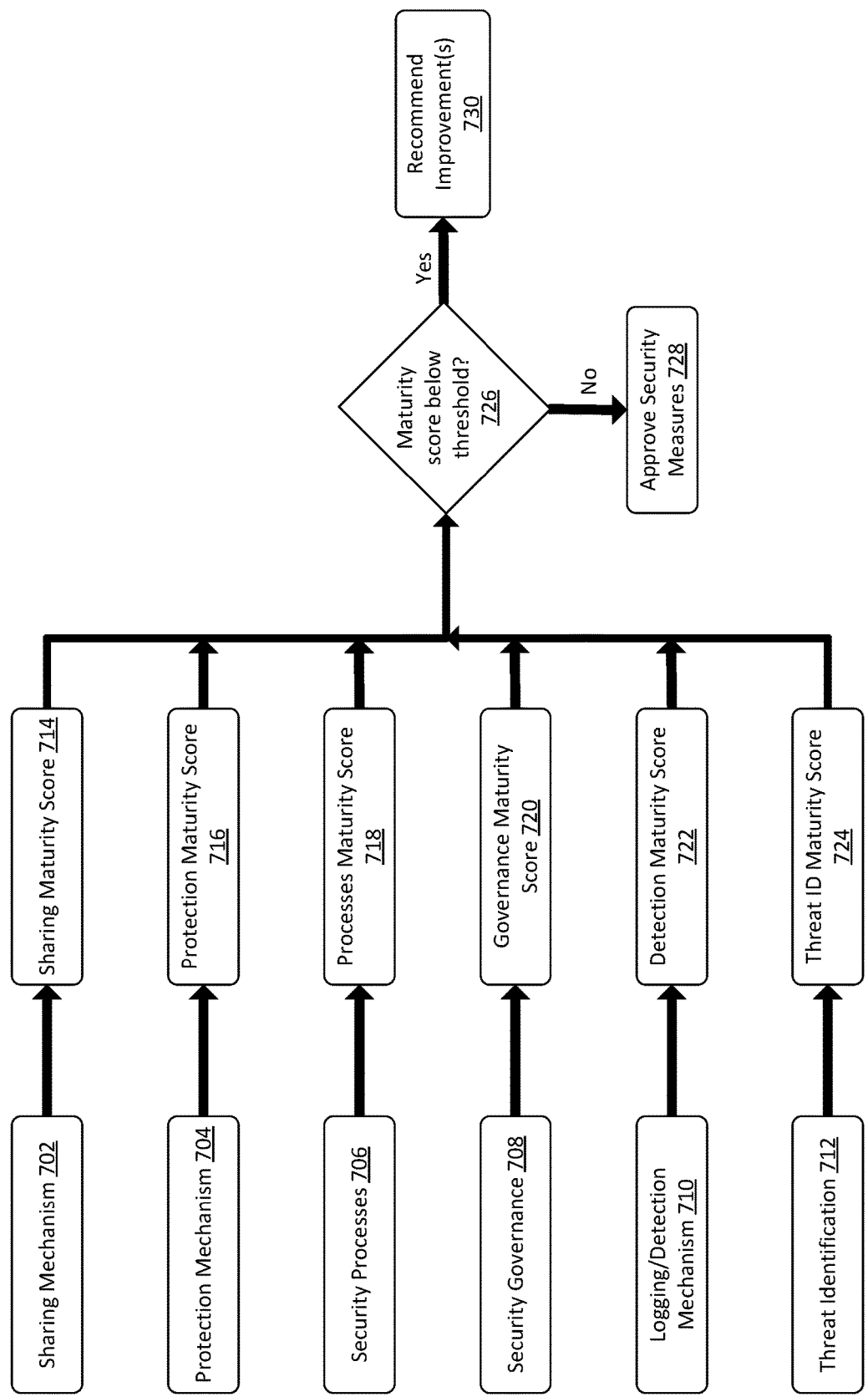
FIG. 7 illustrates security mechanism categories and scoring techniques in accordance with digital property protection systems.

FIG. 7 illustrates security mechanism categories and scoring techniques in accordance with digital property protection systems. For example, when performing the security analyses described above, a security-assessment component may be configured to determine a degree of network security and/or physical security based at least in part on security mechanisms and/or security scoring associated with one or more security categories. For example, the security categories may include one or more sharing mechanisms 702, one or more protection mechanisms 704, one or more security processes 706, security governance 708, logging and/or detection mechanisms 710, and/or threat identification 712. The sharing mechanisms 702 may be analyzed for access controls, periodic review of information sharing, third-party access to information, third-party external disclosure, and/or privilege level determinations, for example. The protection mechanisms 704 may be analyzed for information storage locations, remote access capabilities and/or restrictions, encryption types and/or use, secure file transfer protocols, data-loss prevention tools, and/or physical security mechanisms, for example. The security processes 706 may be analyzed for on-boarding and/or off-boarding property, policy agreements, security training, and/or approval for information sharing and/or information transfer, for example. The security governance 708 may be analyzed for exposure and/or management mechanisms, incident response planning and readiness, security assessments, security metrics, and/or security mechanism testing, for example. The logging and/or detection mechanisms 710 may be analyzed for logging, monitoring, and/or triage capabilities and/or coverage, investigation procedures, forensic procedures, and/or loss-detection abilities, for example. The threat identification 712 may be analyzed for capabilities to identify the type of digital property held by the entity and security considerations associated with each digital property type and/or data formats and/or methods of access. It should be understood that more, less, and/or different security categories may be identified and/or determined other than those specifically listed herein. Additionally, it should be understood that more, less, and/or different information associated with each or some of the categories may be analyzed.

When analyzing the security mechanisms and/or categories described herein, the security-assessment component may be configured to generate a maturity score or similar metric for some or all of the categories. The maturity score may be, for example, on a 1 to 5 scale, with 1 indicating deficient security, 2 indicating that security mechanisms are missing key elements, 3 indicating that security mechanisms meet minimum standards, 4 indicating that security mechanisms exceed minimum standards, and 5 indicating that security mechanisms have strong capabilities. It should be understood that while a 1 to 5 scale is used herein, it is used by way of example and not as a limitation. Other and/or different scales may be utilized and the indications of each portion of such scales may also differ. When a score indicates that the security mechanisms are deficient, that indication may be based at least in part on the security analysis resulting in a finding that critical controls to protect the digital property are missing or ineffective. When a score indicates that the security mechanisms are missing key elements, that indication may be based at least in part on a finding that critical capabilities are in place, but important controls to protect the digital property are missing or ineffective. When a score indicates that the security mechanisms meet minimum standards, that indication may be based at least in part on a finding that baseline capabilities and/or controls are in place, but there are opportunities to improve protection of the digital property. When a score indicates that the security mechanisms exceed minimum standards, that indication may be based at least in part on a finding that capabilities and/or controls exceed baseline requirements, with additional effective capabilities helping protect the digital property. When a score indicates that the security mechanisms have strong capabilities, that indication may be based at least in part on a finding that significant capabilities and/or controls are in place to protect the digital property. By so doing, the security assessment will highlight gaps and/or areas in the controls that may be needed to protect the digital property.

In the example of FIG. 7, a maturity score may be determined for each of the security categories. As such, the security-assessment component may generate a sharing maturity score 714, a protection maturity score 716, a processes maturity score 718, a governance maturity score 720, a detection maturity score 722, and/or a threat-identification maturity score 724. These maturity scores may be analyzed, at block 726, to determine whether one or more of the maturity scores are below a threshold maturity score. In instances where at least one of the maturity scores is below the threshold maturity score, at block 730, a recommendation may be generated for improvement in the security area associated with the security category with the maturity score falling below the threshold maturity score. In instances where a maturity score is at or above the threshold maturity score, at block 728, the broker system may approve the security measures associated with that security category.

Figure 8:
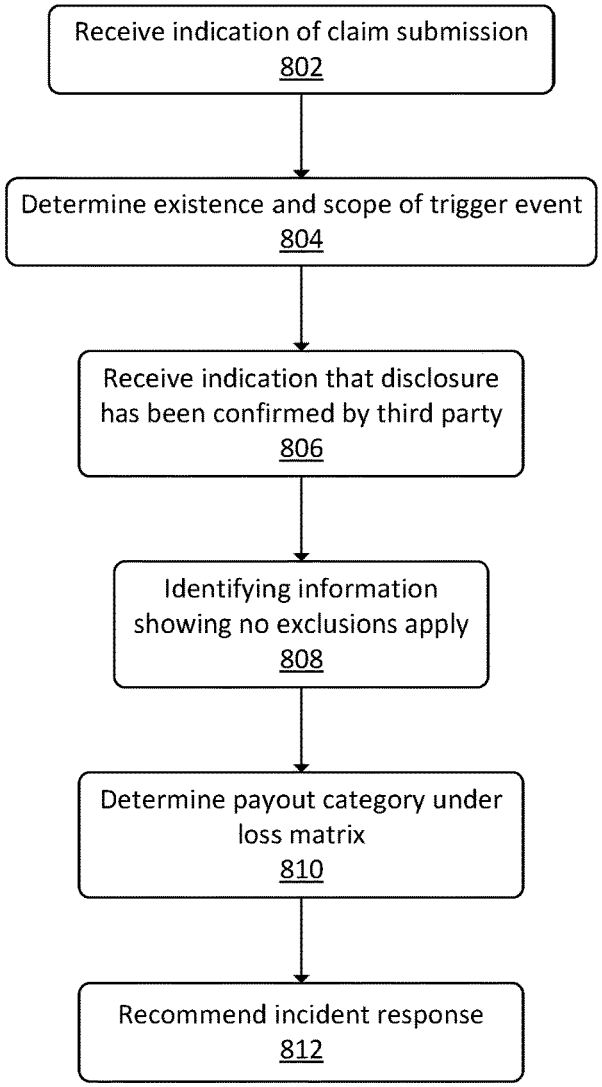
FIG. 8 illustrates a flow diagram of an example process for insurance claim processing in accordance with digital property protection systems.

FIG. 8 illustrates processes for insurance claim processing in accordance with digital property protection systems. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7 and 9-12, although the processes may be implemented in a wide variety of other environments, architectures and systems.

FIG. 8 illustrates a flow diagram of an example process 800 for insurance claim processing in accordance with digital property protection systems. The order in which the operations or steps are described is not intended to be construed as a limitation, and any number of the described operations may be combined in any order and/or in parallel to implement process 800. The operations described with respect to the process 800 are described as being performed by one or more individuals and/or teams of individuals. However, it should be understood that some or all of these operations may be performed by some or all of components, devices, and/or systems described herein.

At block 802, the process 800 may include receiving an indication of submission of a claim for a payout under the terms of an insurance policy insuring against theft of digital property. For example, the entity may make a claim for an insurance payout under the terms of the insurance policy. The entity and/or the insurer may send the claim or an indication thereof to a broker and/or the broker system. In other examples, the broker system may be utilized, such as via one or more user interfaces, to submit a claim by the entity to the insurer.

At block 804, the process 800 may include determining the existence and scope of disclosure of a given trigger event, such as disclosure of the digital property. For example, claims processing may include receiving, identifying, and/or determining a scope of the event associated with the theft of the intellectual property. The scope may include an indication of whether the intellectual property was fully or partially downloaded, copied, viewed, altered, or deleted from the insured's system and/or a third-party system, or otherwise disclosed or used by someone without authorization or in contravention of the insured's security or policies.

At block 806, the process 800 may include receiving an indication that the disclosure has been confirmed by a third party. For example, the process 800 may include receiving a confirmation, such as by a third-party incident forensic company, that the theft event has occurred and/or the scope of such an event. In these examples, the third-party forensic company may be preapproved to analyze whether a trigger event under the insurance policy has occurred and the extent of the event. The entity may hire or otherwise engage the forensic company to perform the trigger-event confirmation analysis and the entity, the insurer, and/or the forensic company may provide the indication that the disclosure has been confirmed to the broker and/or the broker system.

At block 808, the process 800 may include determining that a theft event occurred during a term of the insurance policy and that exclusions do not apply. For example, the one or more exclusions may include when the entity intentionally reduces one or more of the security mechanisms associated with preventing theft of the digital property. Determining that such an exclusion should be applied may be based at least in part on information received from the entity, the entity system, the insurer, the insurer system, and/or the forensic company. With regard to the exclusions, the process 800 may include determining that there has not been an intentional security reduction by the entity. Additionally, the process 800 may include determining that the disclosure of the digital property was not made intentionally by the entity. Additionally, the process 800 may include determining that the theft event occurred during the coverage term under the insurance policy.

In these examples, at block 810 the process 800 may include determining a payout category and/or tier under the loss matrix associated with the insurance policy. For example, the loss matrix may include one or more loss tiers, triggering events and/or causes associated with each tier, payout percentages associated with each tier, and/or notes or guidelines associated with each tier. For example, a loss matrix may include three loss tiers, each with at least one triggering event that indicates the type of loss that has occurred. For example, a first tier may include a triggering event such as the information having been downloaded, copied, and/or viewed without authorization or in contravention of security or policies but has not otherwise been exfiltrated, deleted, altered, disclosed, and/or used. A second tier may include a triggering event such as the information having been materially exfiltrated, altered, deleted, disclosed, and/or used. A third tier may include triggering events such as the information having been published in a manner that destroys trade secret protection afforded to the information, the information having been exfiltrated, altered, and/or deleted in a manner preventing use by the entity, and/or the information having been used by scheduled or similarly positioned key competitor(s). In this example, the third tier may be associated with a payout percentage that is more than the payout percentages associated with the other tiers. The second tier may be associated with a payout percentage that is less than the third-tier payout percentage but less than the first-tier payout percentage. The first tier may be associated with a payout percentage that is less than the second-tier payout percentage. Additional considerations may be utilized to determine differing payout percentages within a tier, such as whether use of the information is likely to be detectable or undetectable. Additional considerations may also be utilized to determine what the payout percentage may be in a given situation, such as the innovation costs associated with the intellectual property, the remediation costs for mitigation loss, and/or investigation costs for detection of theft.

At block 812, the process 800 may include recommending an incident response to the theft event. For example, the claims process may also include incident response analysis, which may include actions to remedy and/or mitigate consequences of the event and/or to preserve evidence for use in mitigation and subrogation.

FIG. 9 illustrates an example loss matrix 900 in accordance with digital property protection systems. For example, a broker system may generate the loss matrix 900 associated with an insurance policy to insure against theft of digital property. The loss matrix 900 may include one or more exposure tiers 902, triggering events 904 and/or causes associated with each tier 902, payout percentages 906 associated with each tier 902, and/or notes 908 or guidelines associated with each tier 902.

For example, the example loss matrix 900 shown in FIG. 9 may include three exposure tiers 902, each with at least one triggering event 904 that indicates the type of loss that has occurred. For example, a first tier 902 may include a triggering event 904 such as the information having been downloaded, copied, and/or viewed without authorization or in contravention of security or policies but has not otherwise been exfiltrated, deleted, altered, disclosed, and/or used. A second tier 902 may include a triggering event 904 such as the information having been materially exfiltrated, altered, deleted, disclosed, and/or used. A third tier 902 may include triggering events 904 such as the information having been published in a manner that destroys trade secret protection afforded to the information, the information having been exfiltrated, altered, and/or deleted in a manner preventing use by the entity, and/or the information having been used by scheduled or similarly positioned key competitor(s). In this example, the third tier 902 may be associated with a payout percentage 906 that is more than the payout percentages 906 associated with the other tiers 902. The second tier 902 may be associated with a payout percentage 906 that is less than the third-tier payout percentage 906 but less than the first-tier payout percentage 906. The first tier 902 may be associated with a payout percentage 906 that is less than the second-tier payout percentage 906. Additional considerations, such as indicated by the notes 908, may be utilized to determine differing payout percentages within a tier, such as whether use of the information is likely to be detectable or undetectable. Additional considerations may also be utilized to determine what the payout percentage 906 may be in a given situation, such as the innovation costs associated with the digital property, the remediation costs for mitigation loss, and/or investigation costs for detection of theft.

Figure 10:
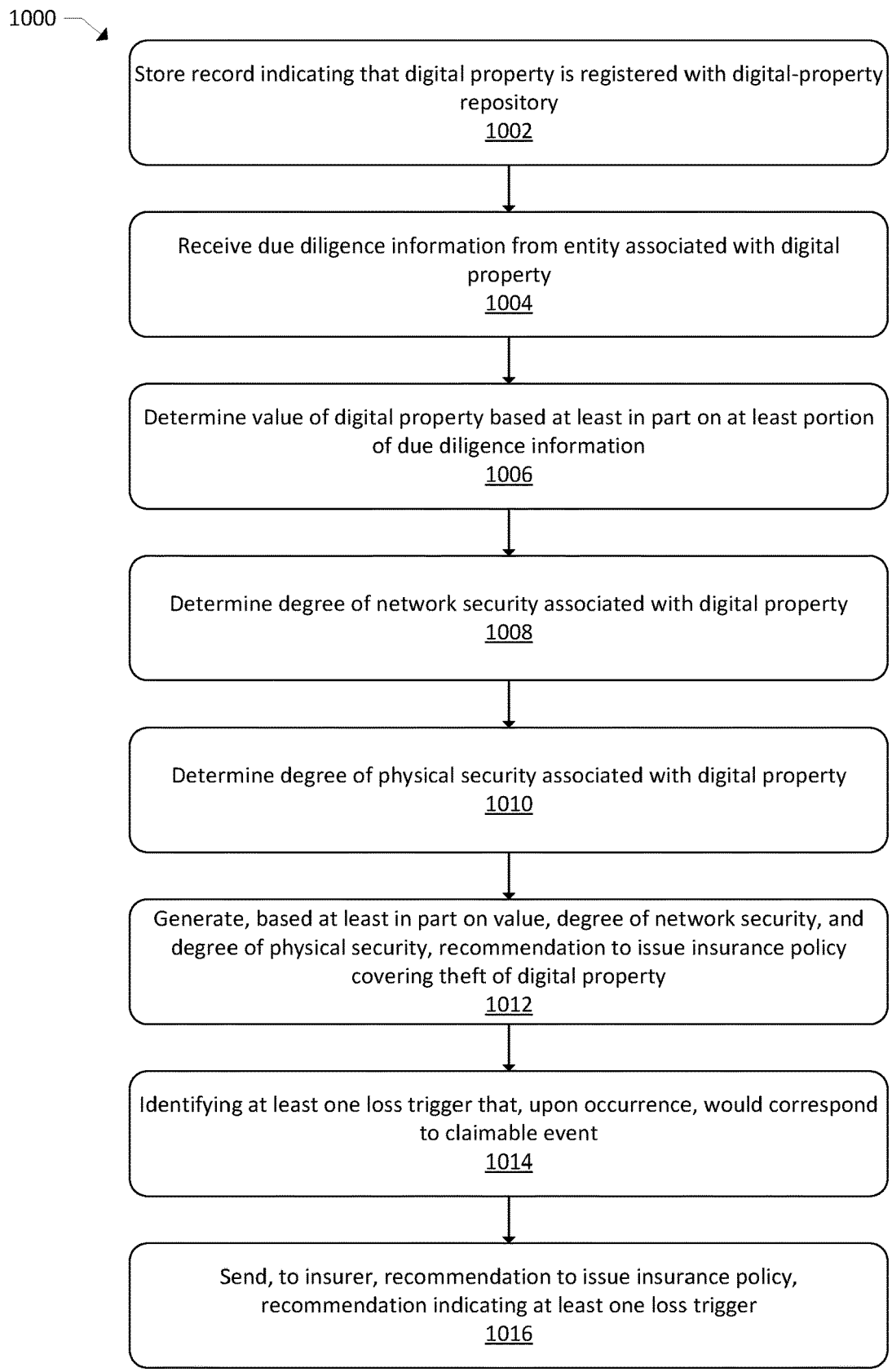
FIG. 10 illustrates a flow diagram of an example process for digital property protection.
Figure 11:
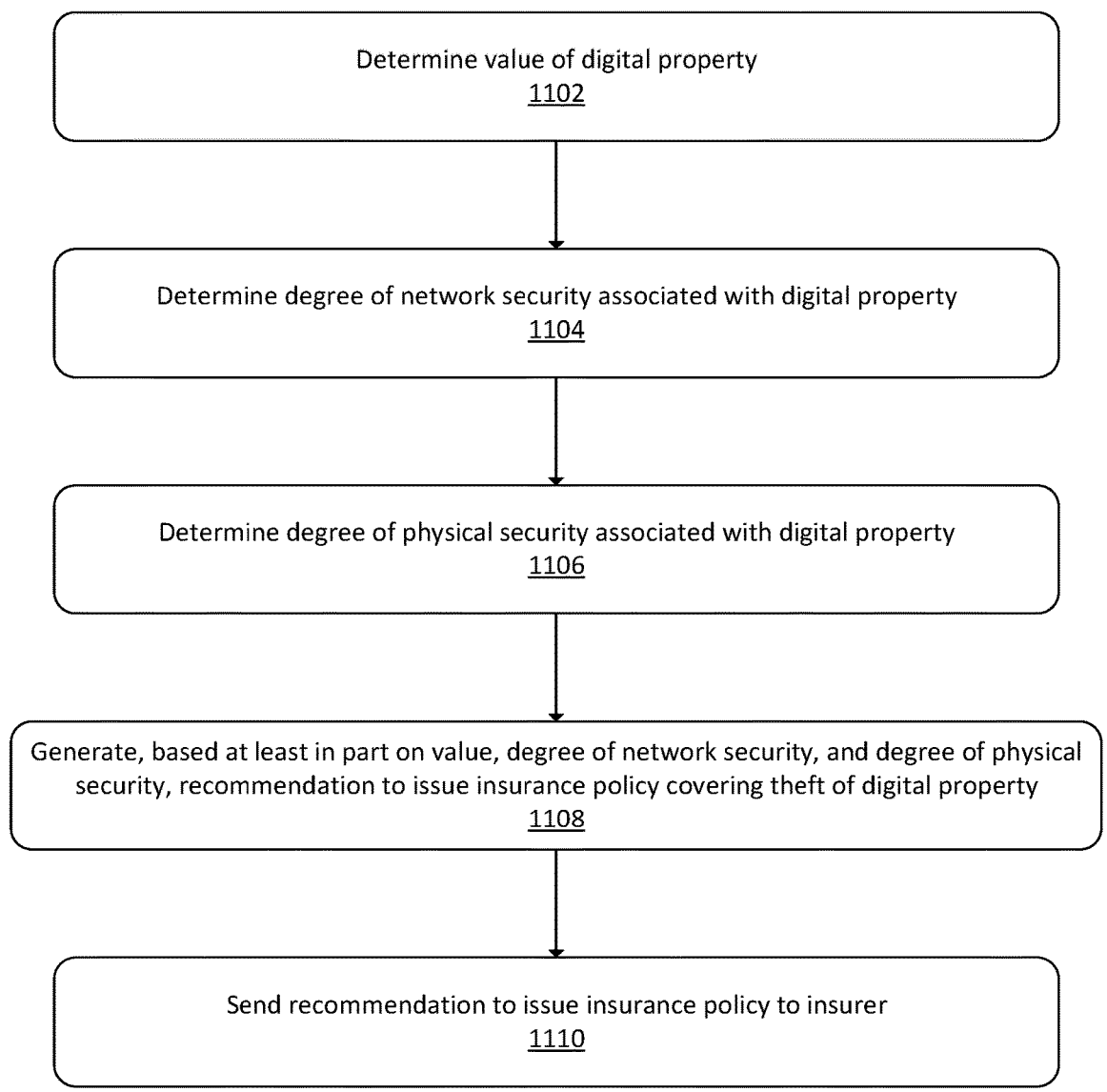
FIG. 11 illustrates a flow diagram of another example process for digital property protection.
Figure 12:
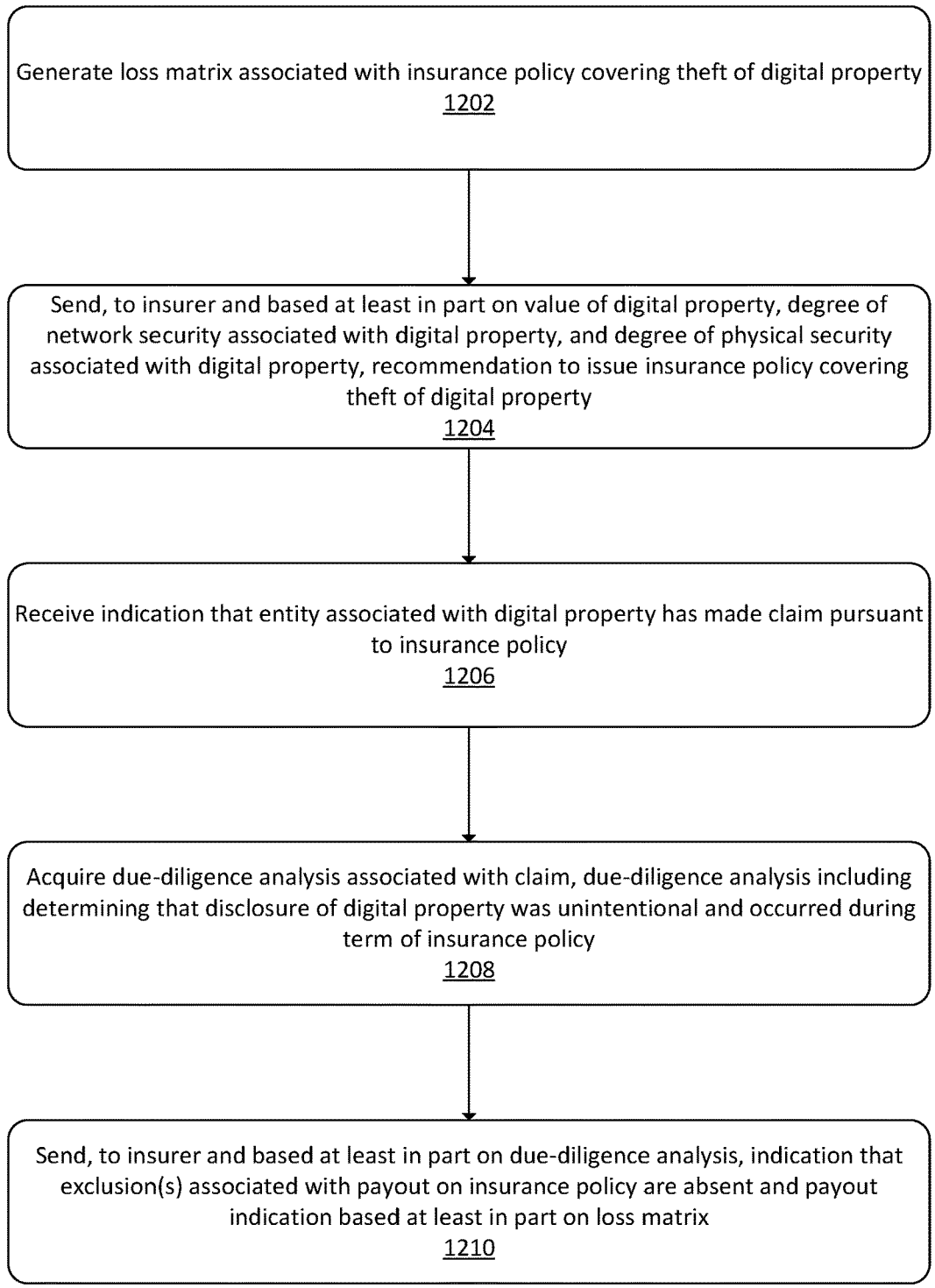
FIG. 12 illustrates a flow diagram of another example process for digital property protection.

FIGS. 10-12 illustrate processes for digital property protection. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-9, although the processes may be implemented in a wide variety of other environments, architectures and systems.

FIG. 10 illustrates a flow diagram of an example process 1000 for digital property collateral protection. The order in which the operations or steps are described is not intended to be construed as a limitation, and any number of the described operations may be combined in any order and/or in parallel to implement process 1000. The operations described with respect to the process 1000 are described as being performed by one or more individuals and/or teams of individuals. However, it should be understood that some or all of these operations may be performed by some or all of components, devices, and/or systems described herein.

At block 1002, the process 1000 may include storing a record indicating that a digital property is registered with a digital-property repository. For example, an entity may identify the digital property to be registered and an obfuscation value may be generated that corresponds to the digital property. The obfuscation value may be sent from the entity device to the broker system. The broker system may utilize the obfuscation value and/or information received from the entity device to generate a record in the digital property registry. The record may include the obfuscation value and/or other identifying information associated with the digital property. Additionally, the broker system may send the obfuscation value to a distributed-ledger system for registering the obfuscation value with the distributed ledger, such as a blockchain ledger. The distributed-ledger system may send a block value representing a block in the blockchain at which the obfuscation value has been registered, as well as other identifying information, such as a timestamp for the registration of the block with the blockchain. The broker system may store the block value along with the obfuscation value in association with the record for the digital property. By so doing, the broker system may be utilized to provide a secure way to register the digital property and identify when the digital property was registered, which may be important when determining if a disclosure of the digital property amounts to misuse and/or misappropriation.

At block 1004, the process 1000 may include receiving due diligence information from an entity associated with the digital property. For example, an intake form may be provided to the entity, which may be requested to provide information in response to the intake form. The intake form may request information associated with what digital property is to be insured, valuation of the digital property, types of data associated with the digital property, types of users with access to the digital property, and/or other similar information. The entity may also be provided with a security questionnaire, which may request information to determine the adequacy of security measures associated with the digital property, to assess exposure of loss of the digital property, to provide recommendations to reduce exposure, to determine potential threats to the digital property, and/or to determine capabilities to detect and investigate incidents associated with the digital property, for example. The entity may also be provided with requests for valuation data, such as income data, development cost data, licensing data, etc. The request for this information may be provided by the insurer system and/or the insurer and/or by the entity devices and/or the entity and may be in the form of electronic files and/or a user interface. When a user interface is used, one or more wizards and/or applications may be utilized to present input fields for users of the entity system to input the requested information and/or documentation. The information and/or documentation may be encrypted such that the information and/or document may be sent in a secure manner.

At block 1006, the process 1000 may include determining a value of the digital property based at least in part on at least a portion of the due diligence information. For example, a valuation component may be utilized to identify, determine, and/or generate one or more values of the digital property. For example, the valuation may include a qualitative analysis of the digital property. The qualitative analysis may include a scored, multifactor assessment of asset opportunity and/or exposure. For example, a degree of coverage associated with the digital property may be determined. Additionally, a degree of opportunity to expand the digital property may be determined. Additionally, a degree of exposure of the digital property may be determined. These determinations may be made utilizing the information obtained during the due diligence processes described elsewhere herein. In general, a favorable qualitative analysis may include a high degree of coverage and opportunity with a low degree of exposure. The qualitative analysis may be utilized, at least in part, to perform a quantitative analysis of the value of the digital property. For example, the quantitative analysis may include an indication of an amount of income attributable to the digital property over the life of the digital property, and/or a replacement and/or substitution cost of the digital property, and/or a development cost of the digital property. The quantitative analysis may be modeled over the course of the policy period for the insurance policy. The qualitative analysis and/or the quantitative analysis may be utilized to generate a report indicating the value of the digital property to be insured.

At block 1008, the process 1000 may include determining a degree of network security associated with the digital property. For example, the degree of the network security may be based at least in part on a first security score determined based at least in part on presence of a network security control, an effectiveness of the network security control, and a scope of the network security control.

At block 1010, the process 1000 may include determining a degree of physical security associated with the digital property. For example, the degree of the physical security may be based at least in part on a second security score determined based at least in part on presence of a physical security control, an effectiveness of the physical security control, and a scope of the physical security control.

At block 1012, the process 1000 may include generating, based at least in part on the value, the degree of the network security, and the degree of the physical security, a recommendation to issue an insurance policy covering theft of the digital property. For example, when the value of the digital property is high enough to merit insuring, a favorable recommendation to issue the insurance policy may be generated. Additionally, the value may provide an indication to the insurer as to what the payout limit(s) should be under the insurance policy. Additionally, when the degree of network security and the degree of physical security is at least at a threshold degree, it may be determined that the entity is taking reasonable steps to maintain the secrecy and/or undisclosed nature of the digital property so as to maintain the digital property as intellectual property.

At block 1014, the process 1000 may include identifying at least one loss trigger that, upon occurrence, would correspond to a claimable event. The loss trigger may be an event that would foreseeably damage the digital property and/or the entity's interest in the digital property. Example loss triggers may include the information having been published in a manner that destroys trade secret protection, the information having been exfiltrated, altered, and/or deleted in a manner that prevents owner use. The loss triggers may also include the information having been used by a scheduled key competitor.

At block 1016, the process 1000 may include sending, to an insurer, the recommendation to issue the insurance policy, the recommendation indicating the at least one loss trigger. Additionally, the recommendation and/or the insurance policy may include an enforcement-action provision indicating that the entity will be covered for a portion of costs incurred enforcing a right in the digital property. The recommendation and/or the insurance policy may also include a cyber-protection provision indicating that the entity will be covered for investigation costs associated with cyberthreats to the digital property.

Additionally, or alternatively, the process 1000 may include performing a qualitative analysis of the digital property, the qualitative analysis indicating a degree of opportunity associated with the digital property and a degree of exposure associated with the digital property. The process 1000 may also include performing, based at least in part on the qualitative analysis, a quantitative analysis of the digital property, the quantitative analysis including at least one of an income amount associated with the digital property, a replacement cost of the digital property, or a development cost of the digital property. In these examples, determining the value of the digital property may be based at least in part on at least one of the qualitative analysis and/or the quantitative analysis.

Additionally, or alternatively, the process 1000 may include receiving security information associated with the digital property, the security information including at least one of a scope of the digital property, an identifier of a threat to the digital property, a method of protection for the digital property, a theft-detection capability, a theft-response capability, or a document validating the security information. The process 1000 may also include generating analysis data based at least in part on the security information, the analysis data including one or more questions associated with the security information. The process 1000 may also include receiving a response to the one or more questions, the response answering the one or more questions. In these examples, determining the degree of the network security may be based at least in part on at least one of the security information or the response. Additionally, in these examples, determining the degree of the physical security may be based at least in part on the at least one of the security information or the response.

Additionally, or alternatively, the process 1000 may include identifying a degree of access restriction associated with the digital property, identifying one or more security tools implemented in association with the digital property, identifying one or more security processes implemented in association with the digital property, identifying one or more security policies implemented in association with the digital property, identifying one or more theft-detection mechanisms implemented in association with the digital property, and/or identifying one or more threats to the digital property. In these examples, determining the degree of the network security may be based at least in part on at least one of the degree of the access restriction, the one or more security tools; the one or more security processes, the one or more security policies, the one or more theft-detection mechanisms, or the one or more threats. Additionally, in these examples, determining the degree of the physical security may be based at least in part on at least one of the degree of the access restriction, the one or more security tools, the one or more security processes, the one or more security policies, the one or more theft-detection mechanisms, or the one or more threats.

Additionally, or alternatively, the process 1000 may include generating a loss matrix associated with the insurance policy. In examples, the loss matrix may include a first loss tier associated with a first trigger event of the one or more trigger events. The loss matrix may also include a second loss tier associated with a second trigger event of the one or more trigger events. The loss matrix may also include a first payout value to be provided to the entity upon occurrence of the first trigger event. The loss matrix may also include a second payout value to be provided to the entity upon occurrence of the second trigger event, the second payout value representing a portion of the first payout value.

FIG. 11 illustrates a flow diagram of an example process 1100 for digital property collateral protection. The order in which the operations or steps are described is not intended to be construed as a limitation, and any number of the described operations may be combined in any order and/or in parallel to implement process 1100. The operations described with respect to the process 1100 are described as being performed by one or more individuals and/or teams of individuals. However, it should be understood that some or all of these operations may be performed by some or all of components, devices, and/or systems described herein.

At block 1102, the process 1100 may include determining a value of a digital property. For example, a valuation component may be utilized to identify, determine, and/or generate one or more values of the digital property. For example, the valuation may include a qualitative analysis of the digital property. The qualitative analysis may include a scored, multifactor assessment of asset opportunity and/or exposure. For example, a degree of coverage associated with the digital property may be determined. Additionally, a degree of opportunity to expand the digital property may be determined. Additionally, a degree of exposure of the digital property may be determined. These determinations may be made utilizing the information obtained during the due diligence processes described elsewhere herein. In general, a favorable qualitative analysis may include a high degree of coverage and opportunity with a low degree of exposure. The qualitative analysis may be utilized, at least in part, to perform a quantitative analysis of the value of the digital property. For example, the quantitative analysis may include an indication of an amount of income attributable to the digital property over the life of the digital property, and/or a replacement and/or substitution cost of the digital property, and/or a development cost of the digital property. The quantitative analysis may be modeled over the course of the policy period for the insurance policy. The qualitative analysis and/or the quantitative analysis may be utilized to generate a report indicating the value of the digital property to be insured.

At block 1104, the process 1100 may include determining a degree of network security associated with the digital property. For example, the degree of the network security may be based at least in part on a first security score determined based at least in part on presence of a network security control, an effectiveness of the network security control, and a scope of the network security control.

At block 1106, the process 1100 may include determining a degree of physical security associated with the digital property. For example, the degree of the physical security may be based at least in part on a second security score determined based at least in part on presence of a physical security control, an effectiveness of the physical security control, and a scope of the physical security control.

At block 1108, the process 1100 may include generating, based at least in part on the value, the degree of the network security, and the degree of the physical security, a recommendation to issue an insurance policy covering theft of the digital property.

At block 1110, the process 1100 may include sending the recommendation to issue the insurance policy to an insurer. For example, when the value of the digital property is high enough to merit insuring, a favorable recommendation to issue the insurance policy may be generated. Additionally, the value may provide an indication to the insurer as to what the payout limit(s) should be under the insurance policy. Additionally, when the degree of network security and the degree of physical security is at least at a threshold degree, it may be determined that the entity is taking reasonable steps to maintain the secrecy and/or undisclosed nature of the digital property so as to maintain the digital property as intellectual property.

Additionally, or alternatively, the process 1100 may include identifying a degree of access restriction associated with the digital property, identifying one or more security tools implemented in association with the digital property, identifying one or more security processes implemented in association with the digital property, identifying one or more security policies implemented in association with the digital property, identifying one or more theft-detection mechanisms implemented in association with the digital property, and/or identifying one or more threats to the digital property. In these examples, determining the degree of the network security may be based at least in part on at least one of the degree of the access restriction, the one or more security tools; the one or more security processes, the one or more security policies, the one or more theft-detection mechanisms, or the one or more threats. Additionally, in these examples, determining the degree of the physical security may be based at least in part on at least one of the degree of the access restriction, the one or more security tools, the one or more security processes, the one or more security policies, the one or more theft-detection mechanisms, or the one or more threats.

Additionally, or alternatively, the process 1100 may include identifying a threat to the digital property, determining a threat category associated with the threat, determining a vulnerability level associated with the threat category, and determining a likelihood that the threat will act on the digital property. The process 1100 may also include generating a second recommendation to take an action based at least in part on the vulnerability level and the likelihood that the threat will act on the digital property and sending the second recommendation to the entity. The process 1100 may also include receiving a response to the second recommendation, the response indicating that the action has been taken. In these examples, generating the first recommendation may be based at least in part on the response indicating that the action has been taken.

Additionally, or alternatively, the process 1100 may include identifying at least one of a physical tool or a software tool to detect theft of the digital property and determining that the at least one of the physical tool or the software tool is unassociated with the entity. The process 1100 may also include generating a second recommendation to utilize the at least one of the physical tool or the software tool and sending the second recommendation to the entity. The process 1100 may also include receiving a response to the second recommendation, the response indicating that the entity has initiated use of the at least one of the physical tool or the software tool. In these examples, generating the first recommendation may be based at least in part on the response indicating that the entity has initiated use of the at least one of the physical tool or the software tool.

Additionally, or alternatively, the process 1100 may include receiving, from the entity and during a term of the insurance policy, one or more reports including updated information associated with one or more aspects of the entity. The process 1100 may also include determining, based at least in part on the one or more reports, that the digital property has been disclosed to a third party and sending, to at least one of the insurer or the entity, an indication that the digital property has been disclosed to the third party.

Additionally, or alternatively, the process 1100 may include performing a qualitative analysis of the digital property, the qualitative analysis indicating a degree of opportunity associated with the digital property and a degree of exposure associated with the digital property. The process 1100 may also include performing, based at least in part on the qualitative analysis, a quantitative analysis of the digital property, the quantitative analysis including at least one of an income amount associated with the digital property, a replacement cost of the digital property, or a development cost of the digital property. In these examples, determining the value of the digital property may be based at least in part on at least one of the qualitative analysis and/or the quantitative analysis.

FIG. 12 illustrates a flow diagram of an example process 1200 for digital property collateral protection. The order in which the operations or steps are described is not intended to be construed as a limitation, and any number of the described operations may be combined in any order and/or in parallel to implement process 1200. The operations described with respect to the process 1200 are described as being performed by one or more individuals and/or teams of individuals. However, it should be understood that some or all of these operations may be performed by some or all of components, devices, and/or systems described herein.

At block 1202, the process 1200 may include generating a loss matrix associated with an insurance policy covering theft of a digital property. For example, the loss matrix may include a first loss tier associated with a first trigger event of the one or more trigger events. The loss matrix may also include a second loss tier associated with a second trigger event of the one or more trigger events. The loss matrix may also include a first payout value to be provided to the entity upon occurrence of the first trigger event. The loss matrix may also include a second payout value to be provided to the entity upon occurrence of the second trigger event, the second payout value representing a portion of the first payout value.

At block 1204, the process 1200 may include sending, to an insurer and based at least in part on a value of a digital property, a degree of network security associated with the digital property, and a degree of physical security associated with the digital property, a recommendation to issue an insurance policy covering theft of the digital property. Additionally, the recommendation and/or the insurance policy may include an enforcement-action provision indicating that the entity will be covered for a portion of costs incurred enforcing a right in the digital property. The recommendation and/or the insurance policy may also include a cyber-protection provision indicating that the entity will be covered for investigation costs associated with cyberthreats to the digital property. Additionally, in examples, the insurance policy may include a burden provision indicating that the entity carries the burden of proof that a trigger event has occurred requiring payout by the insurer.

At block 1206, the process 1200 may include receiving an indication that an entity associated with the digital property has made a claim pursuant to the insurance policy. For example, the entity may make a claim for an insurance payout under the terms of the insurance policy. The entity and/or the insurer may send the claim or an indication thereof to a broker and/or the broker system. In other examples, the broker system may be utilized, such as via one or more user interfaces, to submit a claim by the entity to the insurer.

At block 1208, the process 1200 may include acquiring a due-diligence analysis associated with the claim, the due-diligence analysis including determining that disclosure of the digital property was unintentional and occurred during a term of the insurance policy. For example, the process 1200 may include receiving, identifying, and/or determining a scope of the event associated with the theft of the digital property. The scope may include an indication of whether the intellectual property was fully or partially downloaded, copied, viewed, altered, or deleted from the insured's system and/or a third-party system, or otherwise disclosed or used by someone without authorization or in contravention of the insured's security or policies. The process may also include receiving a confirmation, such as by a third-party incident forensic company, that the theft event has occurred and/or the scope of such an event. The claims process may also include determining if one or more of the exclusions associated with the insurance policy has occurred. The claims process may also include determining the amount of loss attributable to the theft event and/or the payout amount associated with the scope of loss, which may be determined based at least in part on the loss matrixes described herein. The claims process may also include incident response analysis, which may include actions to remedy and/or mitigate consequences of the event and/or to preserve evidence for use in mitigation and subrogation.

At block 1210, the process 1200 may include sending, to the insurer and based at least in part on the due-diligence analysis, an indication that one or more exclusions associated with payout on the insurance policy are absent and a payout indication based at least in part on the loss matrix. For example, the due-diligence analysis may include determining a scope of disclosure of the digital property, the scope of disclosure based at least in part on an amount of the digital property disclosed Additionally, or alternatively, the process 1200 may include determining one or more terms of the insurance policy based at least in part on at least one of (1) first prior insurance-policy terms issued to first entities associated with a first geographic location within a threshold distance from a second geographic location of the entity, or (2) second prior insurance-policy terms associated with a digital-property type of the digital property. In these examples, the recommendation may include the one or more terms.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method, comprising:

receiving a request to register a digital property with a digital-property repository and a document obfuscation value associated with the digital property;

communicating with a blockchain system to cause the blockchain system to include the document obfuscation value on a blockchain of the blockchain system;

receiving, from the blockchain system, confirmation that the document obfuscation value has been included in the blockchain;

generating a record indicating that the digital property is registered with the digital-property repository based at least in part on the document obfuscation value being included in the blockchain;

receiving due diligence information from an entity associated with the digital property;

determining a value of the digital property based at least in part on at least a portion of the due diligence information and the digital property being registered with the digital-property repository;

determining a degree of network security associated with the digital property;

determining a degree of physical security associated with the digital property;

generating, based at least in part on the value, the degree of the network security, and the degree of the physical security, a recommendation to issue an insurance policy covering theft of the digital property;

generating a loss matrix associated with the recommendation, the loss matrix automatically generated based at least in part on the value, the degree of the network security, and the degree of the physical security, the loss matrix including multiple loss tiers and corresponding trigger events;

sending the recommendation to issue the insurance policy to an insurer, wherein the recommendation indicates the loss matrix with the trigger events that, upon occurrence, would correspond to a claimable event;

determining, based at least in part on a report received during a term of the insurance policy, that the digital property has been disclosed to a third party, the report generated utilizing a wizard configured to enable input functionality via a user interface; and sending, to at least one of the insurer or the entity, an indication that the digital property has been disclosed to the third party.

2. The method of claim 1, further comprising:

identifying an access restriction associated with the digital property;

identifying a security tool associated with the digital property;

identifying a security process associated with the digital property;

identifying a security policy associated with the digital property;

identifying a theft-detection mechanism associated with the digital property;

identifying a threat to the digital property;

wherein determining the degree of the network security comprises determining the degree of the network security based at least in part on at least one of the access restriction, the security tool, the security process, the security policy, the theft-detection mechanism, or the threat; and wherein determining the degree of the physical security comprises determining the degree of the physical security based at least in part on at least one of the access mechanism, or the threat.

3. The method of claim 1, wherein:

the degree of the network security is based at least in part on a first security score determined based at least in part on at least one of presence of a network security control, an effectiveness of the network security control, or a scope of the network security control; and the degree of the physical security is based at least in part on at least one of a second security score determined based at least in part on presence of a physical security control, an effectiveness of the physical security control, or a scope of the physical security control.

4. The method of claim 1, wherein the recommendation comprises a first recommendation, and the method further comprises:

identifying a threat to the digital property;

determining a threat category associated with the threat;

determining a vulnerability level associated with the threat category;

determining a likelihood that the threat will act on the digital property;

generating a second recommendation to take an action based at least in part on the vulnerability level and the likelihood that the threat will act on the digital property;

sending the second recommendation to the entity;

receiving a response to the second recommendation, the response indicating that the action has been taken; and wherein generating the first recommendation comprises generating the first recommendation based at least in part on the response indicating that the action has been taken.

5. The method of claim 1, wherein the recommendation comprises a first recommendation, and the method further comprises:

identifying at least one of a physical tool or a software tool to detect theft of the digital property;

determining that the at least one of the physical tool or the software tool is unassociated with the entity;

generating a second recommendation to utilize the at least one of the physical tool or the software tool;

sending the second recommendation to the entity;

receiving a response to the second recommendation, the response indicating that the entity has initiated use of the at least one of the physical tool or the software tool; and wherein generating the first recommendation comprises generating the first recommendation based at least in part on the response indicating that the entity has initiated use of the at least one of the physical tool or the software tool.

6. The method of claim 1, further comprising:

performing a qualitative analysis of the digital property, the qualitative analysis indicating a degree of opportunity associated with the digital property and a degree of exposure associated with the digital property;

performing, based at least in part on the qualitative analysis, a quantitative analysis of the digital property, the quantitative analysis including at least one of:

in income amount associated with the digital property;
a replacement cost of the digital property; or
a development cost of the digital property; and
wherein determining the value of the digital property comprises determining the value of the digital property based at least in part on the quantitative analysis.

7. A system, comprising:
one or more processors; and
non-transitory computer-readable media storing instructions that, when executed by the one or more processors, cause the one or more processors to perform operations comprising:
receiving a request to register a digital property with a digital-property repository and a document obfuscation value associated with the digital property;
communicating with a blockchain system to cause the blockchain system to include the document obfuscation value on a blockchain of the blockchain system;
receiving, from the blockchain system, confirmation that the document obfuscation value has been included in the blockchain;
generating a record indicating that the digital property is registered with the digital-property repository based at least in part on the document obfuscation value being included in the blockchain;
receiving due diligence information from an entity associated with the digital property;
determining a value of the digital property based at least in part on at least a portion of the due diligence information;
determining a degree of network security associated with the digital property;
determining a degree of physical security associated with the digital property;
generating, based at least in part on the value, the degree of the network security, and the degree of the physical security, a recommendation to issue an insurance policy covering theft of the digital property;
generating a loss matrix associated with the recommendation, the loss matrix automatically generated based at least in part on the value, the degree of the network security, and the degree of the physical security, the loss matrix including multiple loss tiers and corresponding triggering events;
sending the recommendation to issue the insurance policy to an insurer, wherein the recommendation indicates the loss matrix with the triggering events that, upon occurrence, would correspond to a claimable event;
determining, based at least in part on a report received during a term of the insurance policy, that the digital property has been disclosed to a third party, the report generated utilizing a wizard configured to enable input functionality via a user interface; and
sending, to at least one of the insurer or the entity, an indication that the digital property has been disclosed to the third party.

8. The system of claim 7, the operations further comprising:
identifying an access restriction associated with the digital property;
identifying a security tool associated with the digital property;
identifying a security process associated with the digital property;
identifying a security policy associated with the digital property;
identifying a theft-detection mechanism associated with the digital property;
identifying a threat to the digital property;
wherein determining the degree of the network security comprises determining the degree of the network security based at least in part on at least one of the access restriction, the security tool, the security process, the security policy, the theft-detection mechanism, or the threat; and
wherein determining the degree of the physical security comprises determining the degree of the physical security based at least in part on at least one of the access mechanism, or the threat.

9. The system of claim 7, wherein:
the degree of the network security is based at least in part on a first security score determined based at least in part on at least one of presence of a network security control, an effectiveness of the network security control, or a scope of the network security control; and
the degree of the physical security is based at least in part on at least one of a second security score determined based at least in part on presence of a physical security control, an effectiveness of the physical security control, or a scope of the physical security control.

10. The system of claim 7, wherein the recommendation comprises a first recommendation, and the operations further comprise:
identifying a threat to the digital property;
determining a threat category associated with the threat;
determining a vulnerability level associated with the threat category;
determining a likelihood that the threat will act on the digital property;
generating a second recommendation to take an action based at least in part on the vulnerability level and the likelihood that the threat will act on the digital property;
sending the second recommendation to the entity;
receiving a response to the second recommendation, the response indicating that the action has been taken; and
wherein generating the first recommendation comprises generating the first recommendation based at least in part on the response indicating that the action has been taken.

11. The system of claim 7, wherein the recommendation comprises a first recommendation, and the operations further comprise:
identifying at least one of a physical tool or a software tool to detect theft of the digital property;
determining that the at least one of the physical tool or the software tool is unassociated with the entity;
generating a second recommendation to utilize the at least one of the physical tool or the software tool;
sending the second recommendation to the entity;
receiving a response to the second recommendation, the response indicating that the entity has initiated use of the at least one of the physical tool or the software tool; and
wherein generating the first recommendation comprises generating the first recommendation based at least in part on the response indicating that the entity has initiated use of the at least one of the physical tool or the software tool.

12. The system of claim 7, the operations further comprising:
performing a qualitative analysis of the digital property, the qualitative analysis indicating a degree of opportunity associated with the digital property and a degree of exposure associated with the digital property;

performing, based at least in part on the qualitative analysis, a quantitative analysis of the digital property, the quantitative analysis including at least one of:

in income amount associated with the digital property;

a replacement cost of the digital property; or a development cost of the digital property; and wherein determining the value of the digital property comprises determining the value of the digital property based at least in part on the quantitative analysis.

13. The system of claim 7, wherein the loss matrix includes:

a first loss tier associated with a first trigger event;

a second loss tier associated with a second trigger event;

a first payout value to be provided to the entity upon occurrence of the first trigger event; and a second payout value to be provided to the entity upon occurrence of the second trigger event, the second payout value representing a portion of the first payout value.

* * * * *